United States Patent
Wakasugi et al.

[11] Patent Number: 5,961,616
[45] Date of Patent: Oct. 5, 1999

[54] DATA TRANSFER SYSTEM

[75] Inventors: Nobuo Wakasugi; Tadashi Kasai; Hiroshi Sakaino; Hiroshi Okada, all of Tokyo, Japan

[73] Assignee: Oki Data Corporation, Tokyo, Japan

[21] Appl. No.: 08/824,521

[22] Filed: Mar. 26, 1997

[30] Foreign Application Priority Data

Mar. 28, 1996 [JP] Japan ................................ 8-074265
Jan. 20, 1997 [JP] Japan ................................ 9-007267

[51] Int. Cl.$^6$ .............................. G06F 13/00; G06F 3/00
[52] U.S. Cl. .................................. 710/65; 710/31; 710/61
[58] Field of Search .............................. 326/94; 327/154; 395/113, 114, 189.05, 285, 439, 559, 842, 877, 878, 551, 552, 558, 821; 710/65, 61, 31

[56] References Cited

U.S. PATENT DOCUMENTS

| | | | |
|---|---|---|---|
| 4,995,003 | 2/1991 | Watanabe et al. | 365/189.05 |
| 5,504,927 | 4/1996 | Okamoto | 710/58 |
| 5,504,929 | 4/1996 | Blair et al. | 710/65 |
| 5,548,732 | 8/1996 | Hoashi et al. | 710/105 |
| 5,576,643 | 11/1996 | Kobayashi et al. | 326/94 |
| 5,581,669 | 12/1996 | Voth | 395/113 |
| 5,594,923 | 1/1997 | Inoue et al. | 710/22 |
| 5,630,029 | 5/1997 | Kosukegawa | 395/114 |
| 5,678,023 | 10/1997 | Adams et al. | 711/112 |
| 5,680,596 | 10/1997 | Iizuka et al. | 710/65 |
| 5,740,468 | 4/1998 | Hirose | 710/57 |
| 5,748,018 | 5/1998 | Ishikawa | 327/154 |

FOREIGN PATENT DOCUMENTS

| | | |
|---|---|---|
| 0 501 489A1 | 9/1992 | European Pat. Off. |
| 07281999 | 10/1995 | Japan . |
| 95/14276 | 5/1995 | WIPO . |
| WO 95/14276 | 5/1995 | WIPO . |

*Primary Examiner*—Joseph E. Palys
*Assistant Examiner*—Nguyen Xuan Nguyen
*Attorney, Agent, or Firm*—Rabin & Champagne, P.C.

[57] ABSTRACT

A data transfer system includes a host which provides a timing signal and data at an output, and a peripheral device which receives the timing signal and data from the host output, and produces an internal timing signal based on detection of a change in either the data or the polarity of the timing signal provided by the host.

24 Claims, 20 Drawing Sheets

DATA TRANSFER SYSTEM

FIELD OF THE INVENTION

The invention relates to a data transfer system in which a host system transmits a strobe signal together with data to be transferred to a peripheral unit.

BACKGROUND OF THE INVENTION

A data transfer system is known in the art using a parallel interface, referred to as a Centronics parallel interface (hereafter abbreviated as Centronics interface). Between a host system and a peripheral, the peripheral unit, a data strobe signal (hereafter simply referred to as a strobe signal) is used to achieve synchronization of data output, and a busy signal sent from the peripheral unit to the host system indicates that the peripheral unit is engaged in a processing operation.

In this kind of data transfer system, the host system transmits the data to a data bus, and delivers the strobe signal when the busy signal is turned off. The peripheral unit receives the data on the data bus in synchronism with the rising edge of the strobe signal.

The interface requires a total of four accesses for each one byte transfer by the host system, including delivery of a data output to an input/output controller provided by the host system, a check of the busy signal, and delivery of a logical "0" and a logical "1" as the strobe signal.

Modification of this is a parallel interface synchronized with a change in data in which not only a change in the strobe signal, but also a change in the data to be transferred is utilized in the timing a data transfer, as disclosed, for example, in Japanese Laid-Open Patent Application No. 281,999/1995, where the host system determines from the busy signal whether or not a peripheral unit is engaged in a processing operation, and if not, transfers one byte of data and also inverts the strobe signal.

In response to the detection of an edge of the strobe signal, the peripheral unit generates a control signal to latch data transferred, and to transfer latched data to a memory by a DMA (direct memory access) process. In this instance, the host system does not effect a recognition of the busy signal until the transfer of a given number of data blocks is completed, and therefore as disclosed in the cited Application, a reduction in the time interval for data transfer is possible.

In a conventional data transfer system, there has been a problem that because the strobe signal is inverted each time the host system transfers one byte of data, it is necessary to provide a time interval for accessing the input/output controller mentioned above, thus retarding the data transfer rate by a corresponding amount.

There is another problem that since the transient responses of the data and the strobe signal, which are used in the parallel interface of the data change synchronized type, vary depending on the characteristics of the host system, the transceiver circuits used in the input and output of the peripheral unit and the quality of the cable which connects the host system and the peripheral unit, transition times of data signals and strobe signals vary from data transfer system to data transfer system, thus limiting the data transfer system to which such a scheme is applicable.

SUMMARY OF THE INVENTION

The above problems are overcome by providing a data transfer system for a host system and a peripheral unit in which the host system confirms whether or not the current data contents remains the same as the contents of the previous data transferred and, if it is the same, the host causes a strobe signal inversion means to invert a strobe signal while transferring the data, while an internal strobe signal generating means of the peripheral unit generates an internal strobe signal based on a change in the contents of received data which is transferred, or an inversion of the strobe signal, the internal strobe signal causing a latching of the transferred data.

BRIEF DESCRIPTION OF THE DRAWINGS

The invention will be better understood by reference to the following detailed description of exemplary embodiments taken with the accompanying drawings, in which.

DETAILED DESCRIPTION OF THE PREFERRED EMBODIMENTS

Figure 1:
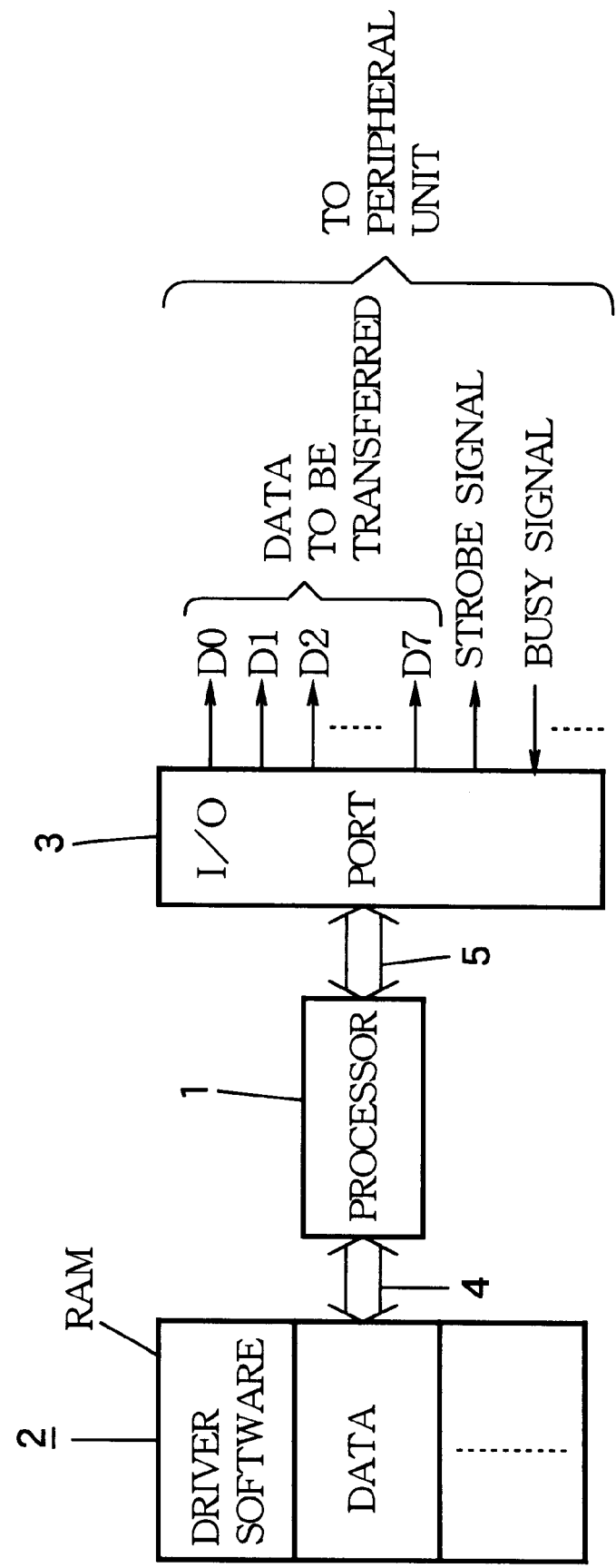
FIG. 1 is a block diagram showing the construction of a host system in accordance with a first embodiment of the invention.

Throughout the drawings, similar or corresponding parts are designated by like reference numerals and characters.

First Embodiment

FIG. 1 is a block diagram showing the construction of a host system according to a first embodiment of the invention. A central processing unit (hereafter referred to as processor) 1 is connected with random access memory (hereafter as RAM) 2 and an input/output device (hereafter as I/O port) 3 through buses 4 and 5, respectively. A connection between I/O port 3 and peripheral unit or units is made by data, strobe signal, and busy signal lines.

RAM 2 contains driver software for controlling data transfer operations, and data to be transferred as D0 to D7. The processor 1 reads an instruction from the driver software and decodes it to execute a data transfer. An instruction from the driver software causes the data to be transferred (D0 to D7) to be read into the processor 1, causing it to transfer the data D0 to D7 to a peripheral unit through I/O Port 3, under control of the voltage of signal lines, such as those for the strobe signal and the busy signal.

Figure 2:
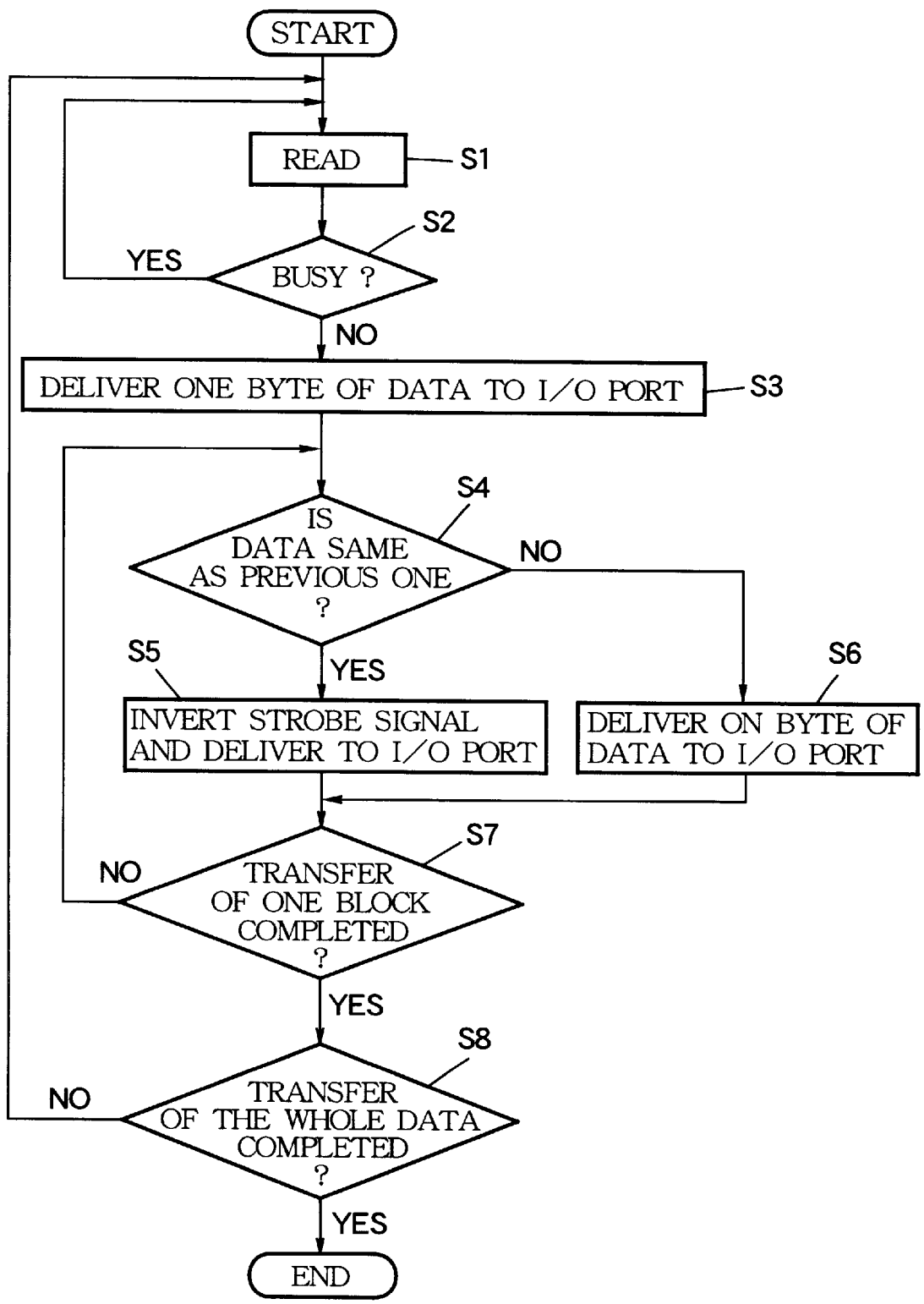
FIG. 2 is a flow chart illustrating the operation of the host system according to the first embodiment of the invention.

FIG. 2 is a flow chart illustrating the operation of the host system according to the first embodiment. At step S1, the processor 1 reads the busy signal from the I/O port 3 indicating whether or not the peripheral unit is engaged in a processing operation. An "on" condition of the busy signal indicates that the peripheral unit is engaged in a processing operation. At decision step S2, the processor 1 returns to step S1 if the busy signal is on (valid or "yes"), but proceeds to step S3 if the busy signal is off (invalid or "no"). At step S3, the processor 1 delivers one byte data to be transferred as bits D0 to D7, to the I/O port 3.

At decision step S4, the processor 1 examines if the data to be transferred D0 to D7 is the same as the previous transferred data D0 to D7, and if it is (yes), the operation proceeds to step S5 while it branches to a step S6 if not (no). At step S5, where the data D0 to D7 is the same, the processor 1 inverts the strobe signal and delivers it to the I/O port 3. At step S6, where the data D0 to D7 is not the same, the processor 1 just delivers one byte of data to the I/O port 3. At decision step S7, the processor 1 examines if the transfer of one data block has been completed. If completed (yes), the operation of the processor 1 proceeds to step S8, while the operation returns to step S4 when not (no). At decision step S8, the processor 1 examines whether the transfer of the whole data has been completed. If it is (yes), the operation is terminated (end), while if not (no), the operation returns to step S1.

A combination of the steps S4 and S5 is equivalent to an implementation of a strobe signal inversion means.

Figure 3:
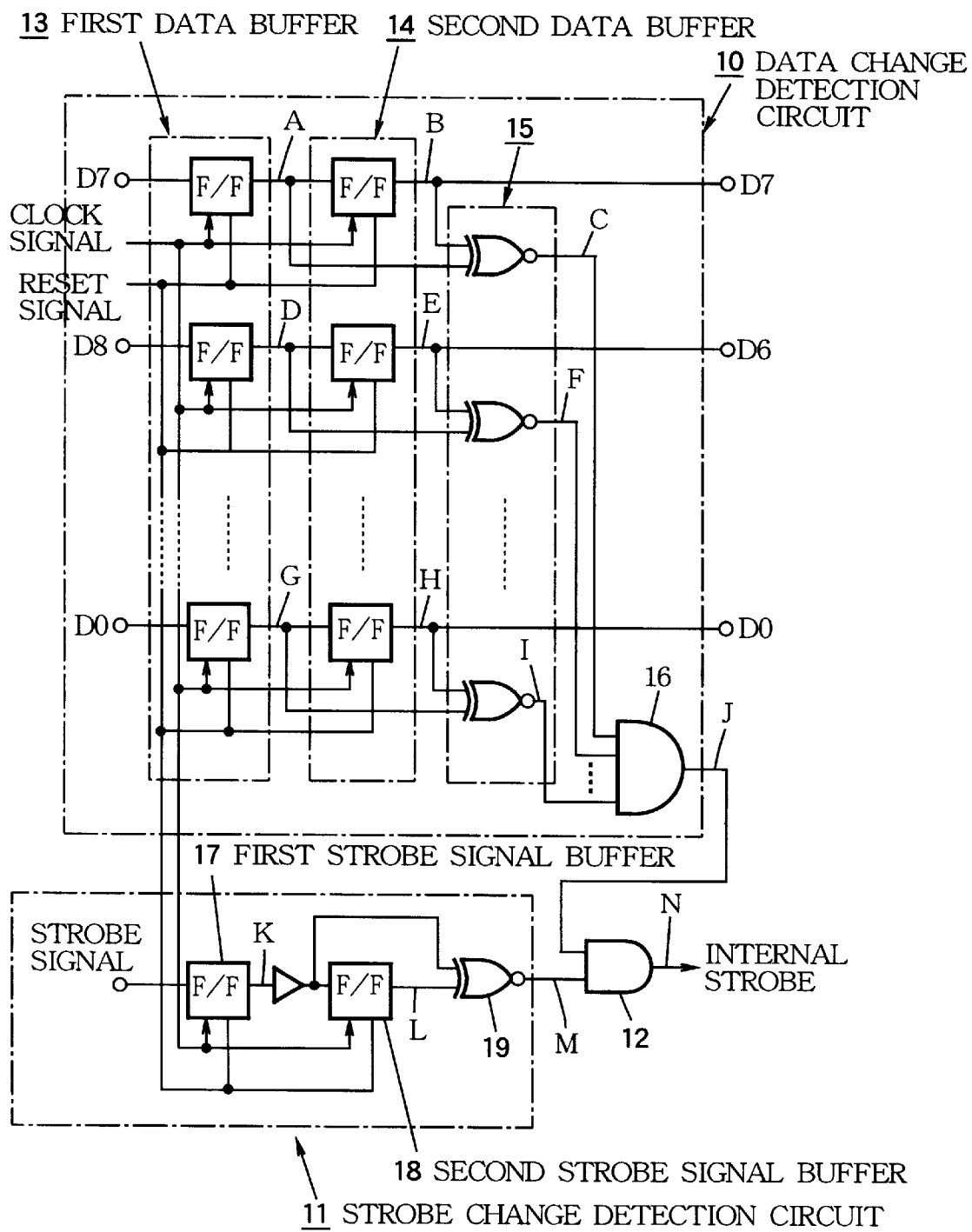
FIG. 3 is a block diagram of a pertinent part of a peripheral unit according to the first embodiment of the invention.

FIG. 3 is a block diagram showing the construction of a pertinent part of a peripheral unit according to the first embodiment. An internal strobe signal generation circuit comprises a data change detection circuit 10, a strobe change detection circuit 11, and a two input AND gate 12 which receives outputs from both detection circuits 10 and 11, and provides an internal strobe signal.

The data change detection circuit 10 comprises a first data buffer 13, formed by a plurality of flip-flop circuits (hereafter as F/F*s), which store the bit contents of data D0 to D7 transferred from the host system, a second data buffer 14, also formed by F/F's, which stores the bit contents of the first data buffer 13 as delayed by one clock, EXNOR gates 15 which receive the contents of both the first and second data buffers 13, 14 and deliver a logical "1" when both respective inputs are equal to "1" or both inputs are equal to "0", and a multiple input AND gate 16 which receives outputs from the EXNOR gates 15 to form a logical product, and delivers a data change signal J upon detection of a change in the contents of the transferred data D0 to D7.

The strobe change detection circuit 11 comprises a first strobe signal buffer 17, formed by a F/F, which stores the strobe signal delivered from the host system, a second strobe signal buffer 18, formed by a F/F, which stores the contents of the first strobe signal buffer 17 as delayed, and an EXNOR gate 19 which receives the contents of the first and the second strobe signal buffers 17, 18 and delivers "1" when both inputs are equal to "1" or both inputs are equal to "0". The strobe change detection circuit 11 delivers a strobe change signal M upon detection of an inversion of the strobe signal.

The two input AND gate 12 receives an output from the multiple input AND gate 16 and an output from the EXNOR gate 19 to form a logical product, thus delivering an internal strobe signal N. Thus, the host system does not invert the strobe signal when there is a change in the contents of the transferred data D0 to D7, but inverts the strobe signal when there is no change in the contents of the transferred data D0 to D7. Accordingly, when the strobe signal is not inverted, the internal strobe signal generation circuit detects a change in the transferred data D0 to D7 by means of the data change detection circuit 10. When the strobe signal is inverted, the strobe change detection circuit 11 detects an inversion of the strobe signal, thus delivering the internal strobe signal.

Figure 4:
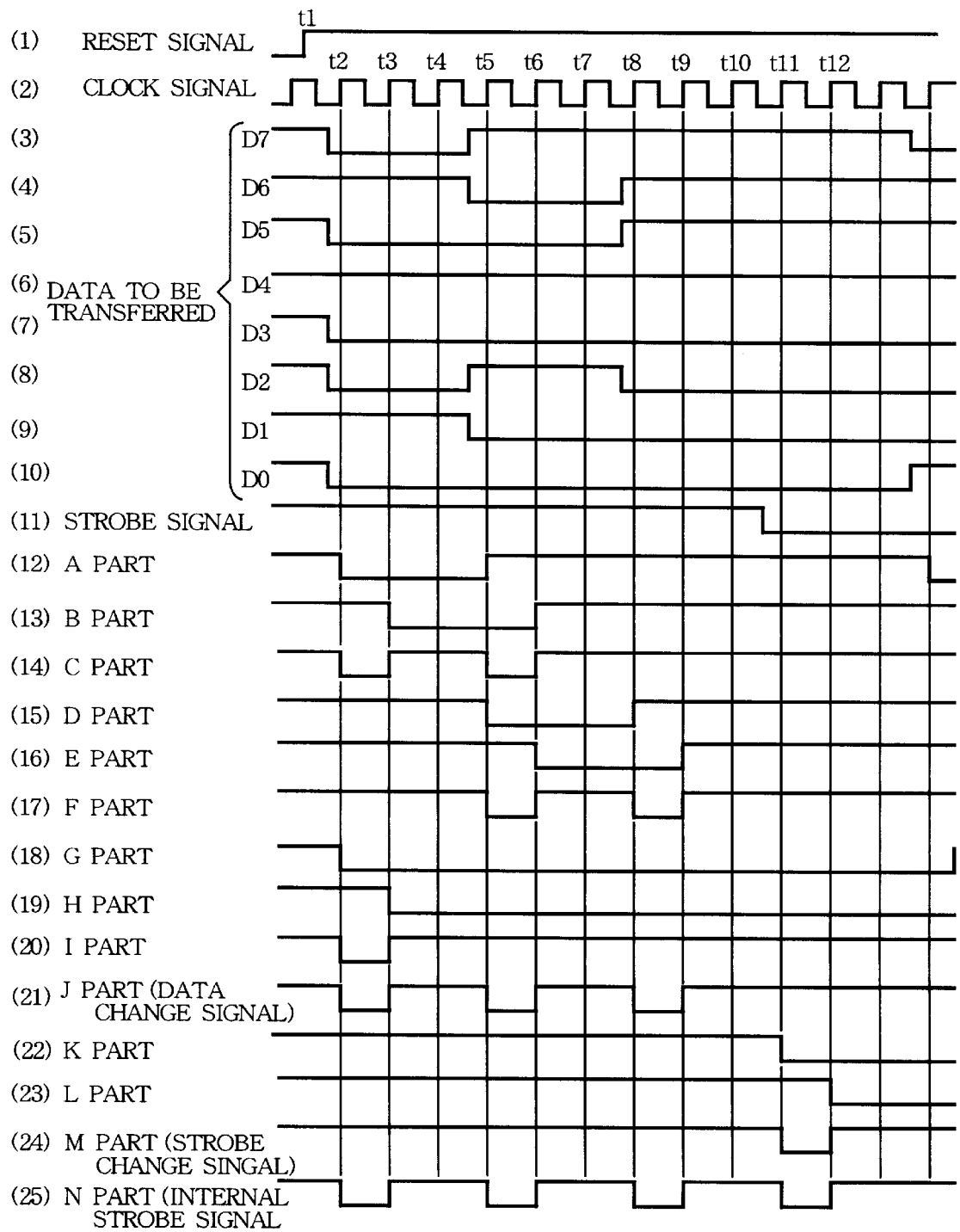
FIG. 4 is a timing chart illustrating the operation of the peripheral unit according to the first embodiment of the invention.

FIG. 4 is a timing chart illustrating the operation of the peripheral unit of the first embodiment, which will be described below with reference to FIG. 3. A reset signal, a clock signal, transferred data D0 to D7, a strobe signal, and outputs from the first data buffer 13, the second data buffer 14, the EXNOR gates 15, the multiple input AND gate 16, the first and the second strobe signal buffers 17, 18, the EXNOR gate 19, and the two input AND gate 12 are indicated at (1) to (25) in FIG. 4. However, it should be understood that the first and the second data buffers 13 and 14, and the EXNOR gates 15 are shown as delivering outputs when only transferred data D7, D6 and D0 are maintained as required to conform to the illustration in FIG. 3.

At time t1 when the power supply of the peripheral unit is turned on, the reset signal causes all of the first and the second data buffers 13, 14, the EXNOR gates 15, the multiple input AND gate 16, the first and the second strobe signal buffers 17, 18, the EXNOR gate 19 and the two input AND gate to deliver outputs of "1".

At time t2 when the clock signal rises, transferred data D0 to D7 is stored in the first data buffer 13, while the output from the first data buffer 13 is stored in the second data buffer 14. As shown at (3), (5),(7), (8),and (10) in FIG. 4, when the first data buffer 13 contains transferred data which has changed from "1" to "0", "0" is delivered to the EXNOR gates 15 as shown at (12) and (18) in FIG. 4. Since the second data buffer 14 still contains the contents which prevails before the contents of the first data buffer 13 changes, "1" is delivered to the EXNOR gates 15 as shown at (13), (16) and (19) in FIG. 4.

As shown, an output from the first data buffer 13 and an output from the second data buffer 14 are fed to the EXNOR gates 15, which therefore delivers a logical "0" to the multiple input AND gate 16, as shown at (14), (20) in FIG. 4. The multiple input AND gate 16 forms a logical product, whereby a logical "0" is delivered from the multiple input AND gate 16 to the two input AND gate 12 as shown at (21) in FIG. 4 indicating a data change.

On the other hand, in response to the rising edge of the same clock signal at time t2, the strobe signal is stored in the first strobe signal buffer 17, the output of which is in turn stored in the second strobe signal buffer 18. Because the strobe signal is not inverted, the contents of both the first and second strobe signal buffer 17, 18 remains logical "1", as indicated at (22),(23). The EXNOR gate 19, which responds to outputs from the first and second strobe signal buffer 17, 18, delivers a logical "1" to the two input AND gate 12, as indicated at (24) in FIG. 4 thus indicating no change in the strobe signal.

The two input AND gate 12 forms a logical sum from the "0" output from the multiple input AND gate 16 and the "1" output from the EXNOR gate 19, thus changing the output from logic level "1" to "0", as shown at (25) providing the internal strobe signal.

At time t3, in response to the rising edge of the clock signal, transferred data D0 to D7 is stored in the first data buffer 13, the output from which is in turn stored in the second data buffer 14. Since the contents of the transferred data D0 to D7 remains unchanged, both the first and second data buffers 13, 14 store the same contents, whereby the EXNOR gates 15 all deliver a logical "1", and the multiple input AND gate 16 delivers a logical "1" to the two input AND gate 16, as shown at (21) in FIG. 4 indicating no change in data.

On the other hand, in response to the rising edge of the same clock signal, the strobe signal is stored in the first strobe signal buffer 17, the output from which is in turn stored in the second strobe signal buffer 18. Because the strobe signal is not inverted, the contents of both the first and second strobe signal buffers 17, 18 remains logic level "1" as indicated at (22) and (23) in FIG. 4. The EXNOR gate 19 forms a logical "1" from the outputs from the first and the second strobe signal buffers 17, 18, which is delivered to the two input AND gate 12, as shown at (24) in FIG. 4.

The two input AND gate 12 forms a logical sum from the "1" output from the multiple input AND gate 16 and the "1" output from the EXNOR gate 19, changing its output from logic level "0" to "1" as shown at (25). As a consequence, the internal strobe signal generation circuit generates an internal strobe signal (25) which falls at time t2 and which rises at time t3. The falling edge of the internal strobe signal is detected to produce a control signal in a manner described in Japanese Laid-Open Patent Application No. 281,999/95, thus latching the contents of the transferred data D0 to D7.

At time t4, in response to the rising edge of the clock signal, the transferred data D0 to D7 is stored in the first data buffer 13, the output of which is in turn stored by the second data buffer 14. Because the contents of the transferred data D0 to D7 remains unchanged, both the first and second data buffers 13, 14 contain the same contents. Accordingly, all of the EXNOR gates 15 deliver a logical "1", whereby the multiple input AND gate 16 delivers a logical "1" to the two input AND gate 12, as shown at (21) in FIG. 4.

On the other hand, in response to the rising edge of the same clock signal, the strobe signal is stored in the first strobe signal buffer 17, the output of which is in turn stored by the second data buffer 18. Because the strobe signal is not inverted, both the first and the second strobe signal buffers 17, 18 contain "1" as before, as shown at (22) and (23) in FIG. 4. Accordingly, the EXNOR gate 19 forms a logical "1" from the outputs from the first and second strobe signal buffers 17, 18, which is delivered to the two input AND gate 12, as shown at (24) in FIG. 4.

The two input AND gate 12 forms a logical sum from the "1" output from the multiple input AND gate 16 and the "1" output from the EXNOR gate 19, thus delivering a logic level "1", as shown at (25) in FIG. 4.

An operation which occurs in response to the rising edge of clock signals generated at times t5 and t8 is similar to the operation which occurs in response to the rising edge of the clock signal at time t2 since the contents of the transferred data D0 to D7 are changed and the strobe signal is not inverted. An operation which occurs in response to the rising edge of clock signals generated at times t6 and t9 is similar to the operation which occurs in response to the rising edge of the clock signal at time t3. Finally, an operation which occurs in response to the rising edge of clock signals at times t7 and t10 is similar to the operation which occurs in response to the rising edge of the clock signal at time t4.

In response to the rising edge of the clock signal which occurs at time t11, the transferred data D0 to D7 and the strobe signal are stored in the first data buffer 13 and the first strobe signal buffer 17, respectively, and outputs from the first data buffer 13 and the first strobe signal buffer 17 are in turn stored by the second data buffer 14 and the second strobe signal buffer 18, respectively. The contents of the transferred data D0 to D7 remains unchanged, while the strobe signal is inverted from "1" to "0", as shown at (11) in FIG. 4, whereby the data change detection circuit 10 and the strobe change detection circuit 11 deliver "1" and "0", respectively, to the two input AND gate 12, which therefore delivers "0", as shown at (25) in FIG. 4.

In response to the rising edge of a clock signal which occurs at time t12, the data change detection circuit 10 delivers "1" as shown at (21) while the strobe change detection circuit 11 delivers an output which changes from "0" to "1", as shown at (24) in FIG. 4, whereby an internal strobe signal is generated, as shown at (25).

It will be seen from the above description that whenever the contents of the transferred data D0 to D7 changes or the strobe signal is inverted, the internal strobe signal changes in synchronism therewith.

It will be noted that the multiple input AND gate 16, the EXNOR gate 19 and the two input AND 12 gate may be replaced by a multiple input NAND gate, an EXOR gate and a two input NOR gate, respectively, with similar results. In this manner, various combinations of logical circuits are contemplated within the scope of the invention described.

Thus, in the present embodiment, the peripheral unit is provided with a data change detection circuit 10 and a strobe change detection circuit 11 so that an internal strobe signal, which is effective to latch transferred data, is generated on the basis of a change in the contents of the transferred data or an inversion of the strobe signal. In this manner, the number of times the strobe signal delivered by the host system is inverted can be reduced, and this means that the number of times the host system accesses an input/output controller, or the like, in order to invert the strobe signal, or the number of times the peripheral unit makes an access in order to detect the strobe signal, can also be reduced. This permits the data transfer rate to be improved by reducing an access time required with respect to input/output controller.

In the first embodiment, the contents of the transferred data D0 to D7 is examined, and the strobe signal is inverted when the contents of the data D0 to D7 remains unchanged. However, a similar effect can be achieved by examining only the two least significant bits, for example, which experience a change in data contents at a high frequency and inverting the strobe signal when they remain the same as before.

Second Embodiment

In a second embodiment of the invention, the peripheral unit includes a first-in first-out (FIFO) type memory as a receiving buffer in which transferred data D0 to D7 from the host system is latched. This peripheral unit is provided with means for calculating the free storage capacity of the receiving buffer, means for detecting a status in which the calculated free storage capacity is less than or equal to a given value, and means for delivering this status to the host system as a busy signal. Whenever the host system recognizes that the busy signal is off, it transmits an amount of data, (e.g., a block) which corresponds to the free storage capacity of the receiving buffer, in succession.

Figure 5:
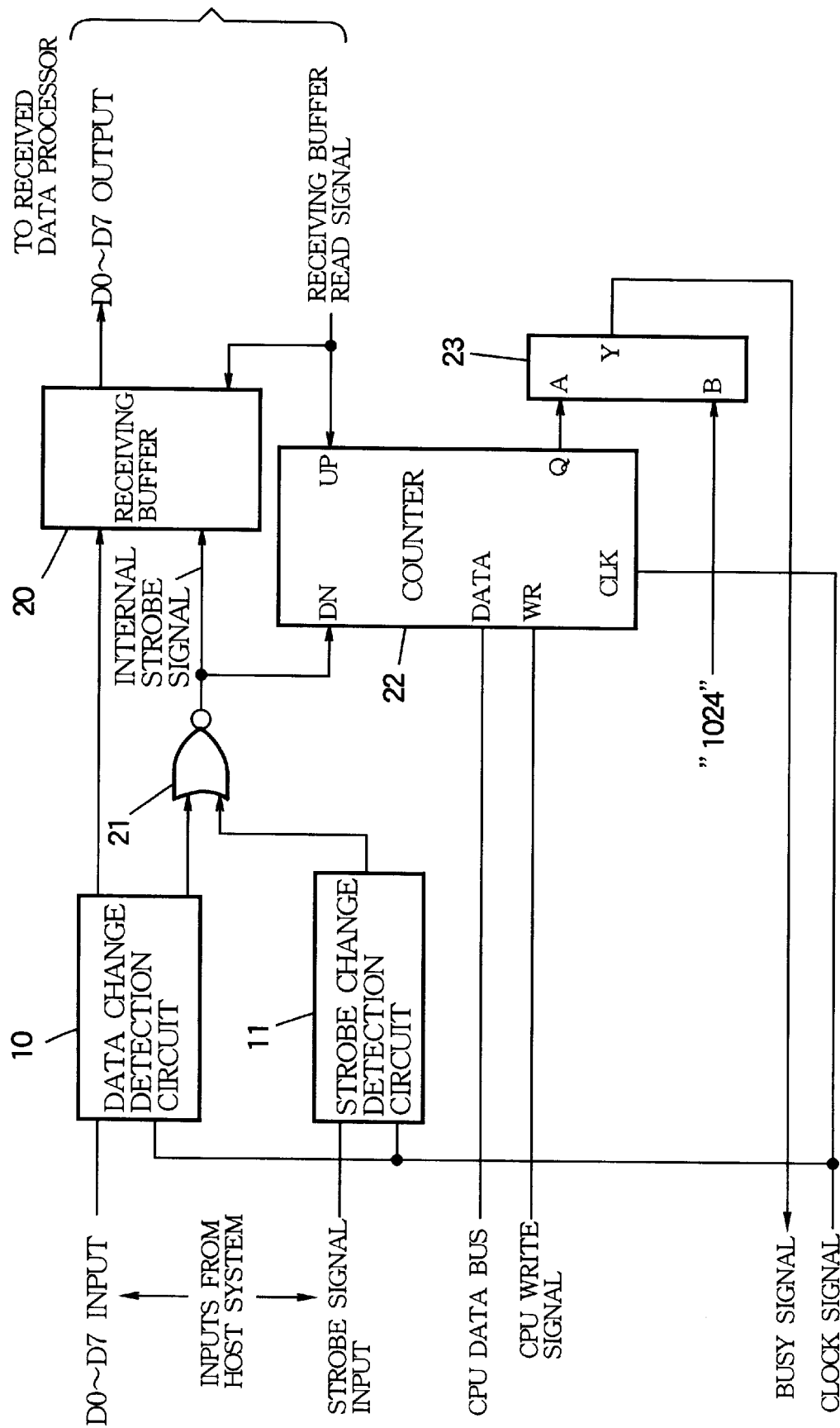
FIG. 5 is a block diagram of a pertinent part of a peripheral unit according to a second embodiment of the invention.

FIG. 5 is a block diagram showing the construction of a pertinent part of the peripheral unit according to the second embodiment. The peripheral unit of the second embodiment differs from the peripheral unit of the first embodiment shown in FIG. 3 in the provision of a receiving buffer 20 of the FIFO type which receives transferred data D0 to D7, NOR gate 21, a counter 22 which calculates the free capacity of the receiving buffer 20, and a comparator 23 which detects a status in which the calculated free capacity exceeds a given value.

NOR gate 21, acting in place of the two input AND gate 12 shown in FIG. 3, receives outputs from the data change detection circuit 10 and the strobe change detection circuit 11 to form an logical sum (OR) of these outputs, which is then inverted and delivered to the receiving buffer 20 and the counter 22 as an internal strobe signal. On the basis of the internal strobe signal, the receiving buffer 20 latches transferred data D0 to D7 which is input from the data change detection circuit 10.

The counter 22 is an up/down counter of the clock synchronized type, and has a DATA input terminal, a WR input terminal for a write signal, an UP input terminal for a count-up signal, a DN input terminal for a count-down signal, a Q output terminal and a CLK clock input terminal. The DATA input terminal and WR input terminal are connected to a data bus and a write signal line, respectively, which are connected to the CPU which controls the peripheral unit. The DN input terminal is connected to the output terminal of NOR gate 21 while the UP input terminal is connected to a receiving buffer read signal line which is in turn connected to a received data processor, not shown. The receiving buffer read signal indicates to the counter 22 a read-out of data from the receiving buffer 20. The Q output terminal of counter 22 is connected to one input terminal A of the comparator 23, thus delivering a count in the counter 22 the comparator 23.

The counter 22 operates in synchronism with a rising edge of a clock signal in a manner to be described below. When an initial value which is to be loaded into the counter 22 is supplied to the DATA input terminal and a "1" is applied to the WR input terminal, the initial value is loaded into the counter 22. When "0" is applied to the UP input terminal, the counter 22 is incremented by 1, while when a "0" is applied to the DN input terminal, the counter 22 is decremented by 1.

The other input terminal B of the comparator 23 is connected to a dip switch or the like, which supplies a fixed comparison value, such as 1,024, for example. The output terminal Y of the comparator 23 is connected to a busy signal line, on which "1" (busy) is delivered to a host system for a count equal to or less than the fixed comparison value of 1,024, but on which "0" (not busy) is delivered to the host system for a count which is greater than the fixed comparison value of 1,024. When the output from the comparator 23 is "1", the host system recognizes this as an on condition of the busy signal, while it recognizes an off condition of the busy signal when the output from the comparator 23 is "0".

The host system is constructed the same as the host system shown in FIG. 1.

Figure 6:
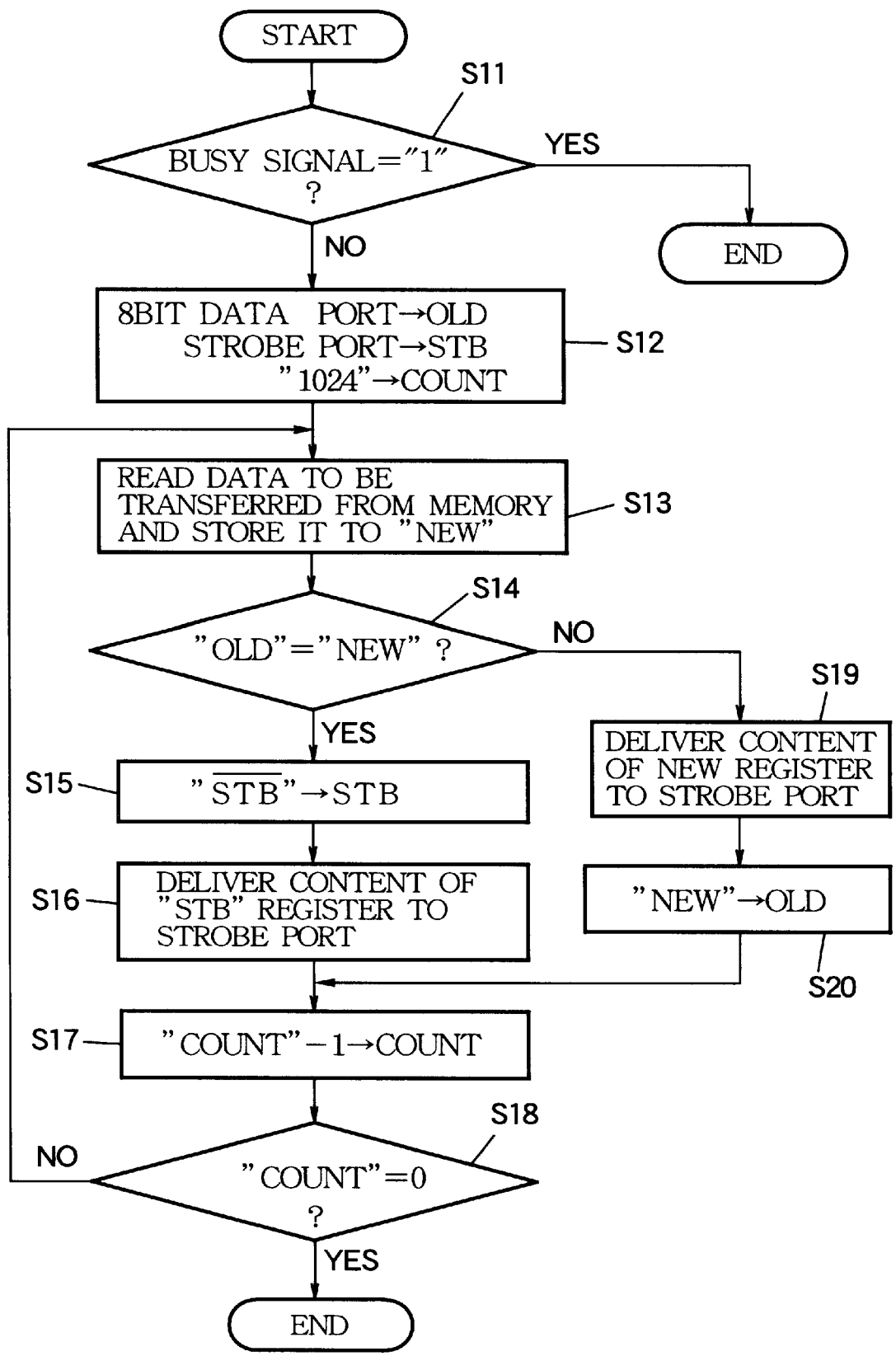
FIG. 6 is a flow chart illustrating the operation of a host system according to the second embodiment of the invention.

FIG. 6 is a flow chart illustrating the operation of a host system according to the second embodiment of the invention. This operation is performed as interrupt operation of the host system. At step S11, the processor 1 reads the busy signal from the I/O port 3. When the busy signal is "1", the interrupt operation is terminated, but if it is not, the operation proceeds to step S12. At step S12, the processor 1 reads a value at 8-bit data port (D0 to D7) which is delivered to the peripheral unit, transferring it to an OLD register. It also reads the value at a strobe port which is delivered to the peripheral unit, transferring it to an STB register. Subsequently, the fixed value of 1,024, indicating one block of transferred data, is transferred from RAM 2 to a COUNT register.

At step S13, the processor 1 reads data D0 to D7, which is to be transferred to the peripheral unit, from the RAM 2, and transfers it to a NEW register. At step S14, the processor 1 compares the contents of the OLD register with the contents of the NEW register, and if the contents are the same, the operation proceeds to step S15 while the operation branches to step S19 if the contents are different from each other. At step S15, the processor 1 inverts the contents of the STB (strobe) register. At step S16, the processor 1 delivers the contents of the STB register to the strobe port as the strobe signal. At step S17, the processor 1 decrements the contents of the COUNT register by 1. If the contents of the COUNT register equal 0, the processor 1 terminates the interrupt operation at step S8. However, if the contents are otherwise, the operation returns to step S13. At step S19, the processor 1 delivers the contents of the NEW register to 8-bit data port as data to be transferred. At step S20, the processor 1 transfers the contents of the NEW register to the OLD register and then proceeds to step S17.

The operation will now be described. When the power supply for the peripheral unit is turned on, the CPU which controls the peripheral unit supplies an initial value to the counter 22, which is chosen to be greater than the fixed value 1,024. Accordingly, a busy signal having an off condition ("1") is delivered from the output terminal Y of the comparator 23 to the host system. The host system then performs a data transfer to the peripheral unit through a time division operation, and as shown in FIG. 6, initiates the block data transfer to the peripheral unit by a timer interrupt operation. When transferred data D0 to D7 from the host system is supplied to the data change detection circuit 10 and the strobe signal is supplied to the strobe change detection circuit 11, the data change detection circuit 10 operates to detect a change in the data supplied from the host system while the strobe change detection circuit 11 operates to detect a change in the strobe signal supplied from the host system, in the same manner as described for the first embodiment. NOR gate 21 inverts a logical sum of these outputs from the detection circuits 10, 11, thus forming an internal strobe signal. In this manner, the internal strobe signal is provided by the NOR gate 21. The receiving buffer 20 latches transferred data D0 to D7, which is supplied from the data change detection circuit 10, on the basis of the internal strobe signal. The counter 22 is decremented by 1 also due to the internal strobe signal. Subsequently, when more transferred data D0 to D7 is fed from the host system, the peripheral unit latches the transferred data D0 to D7 in the receiving buffer 20 on the basis of the internal strobe signal, and decrements the counter 22 by 1. After the block has been transferred, the counter 22 count valve will be less than or equal to 1024 and therefore the busy signal will be 1 (busy).

As mentioned previously, the peripheral unit includes a received data processor, which reads one byte of data from the leading end of data stored in the receiving buffer 20 for processing, by delivering the receiving buffer read signal "0" to the receiving buffer 20 and the counter 22. In response to the receiving buffer read signal "0", the counter 22 is incremented by 1. After having read out the block of data from buffer 20, the counter 22 count value will be again greater than 1024, and therefore the busy signal will be (not busy).

The comparator 23 compares the count in the counter 22 with the fixed value 1,024, and when the count is equal to or less than 1,024, it delivers a valid busy signal ("1") to the host system. When the count is greater than 1,024, it delivers a invalid busy signal ("0") to the host system. Upon recognizing that the busy signal is invalid, the host system transmits an amount of data D0 to D7 (a block), which corresponds to the free storage capacity of the receiving buffer 20 (e.g., 1024), in succession. The value of 1,024 is used for explaining the invention and in practice could be some other value depending on system requirements.

In the second embodiment, the peripheral unit sets the busy signal to invalid when the free capacity of the receiving buffer exceeds one block. In this manner, data transfer can be controlled in units of one block. Such a control of the data transfer is not performed in the first embodiment, and hence, in order to receive data from the host system without a loss of data, it has been necessary that all the data be received and stored in the receiving buffer of the peripheral unit at once. However, a such need is eliminated in the second embodiment, which allows a receiving buffer of a reduced capacity to be used.

Third Embodiment

A third embodiment is arranged such that transferred data is latched after waiting for the termination of a transition state, by detecting a transition state of the transferred data.

Figure 7:
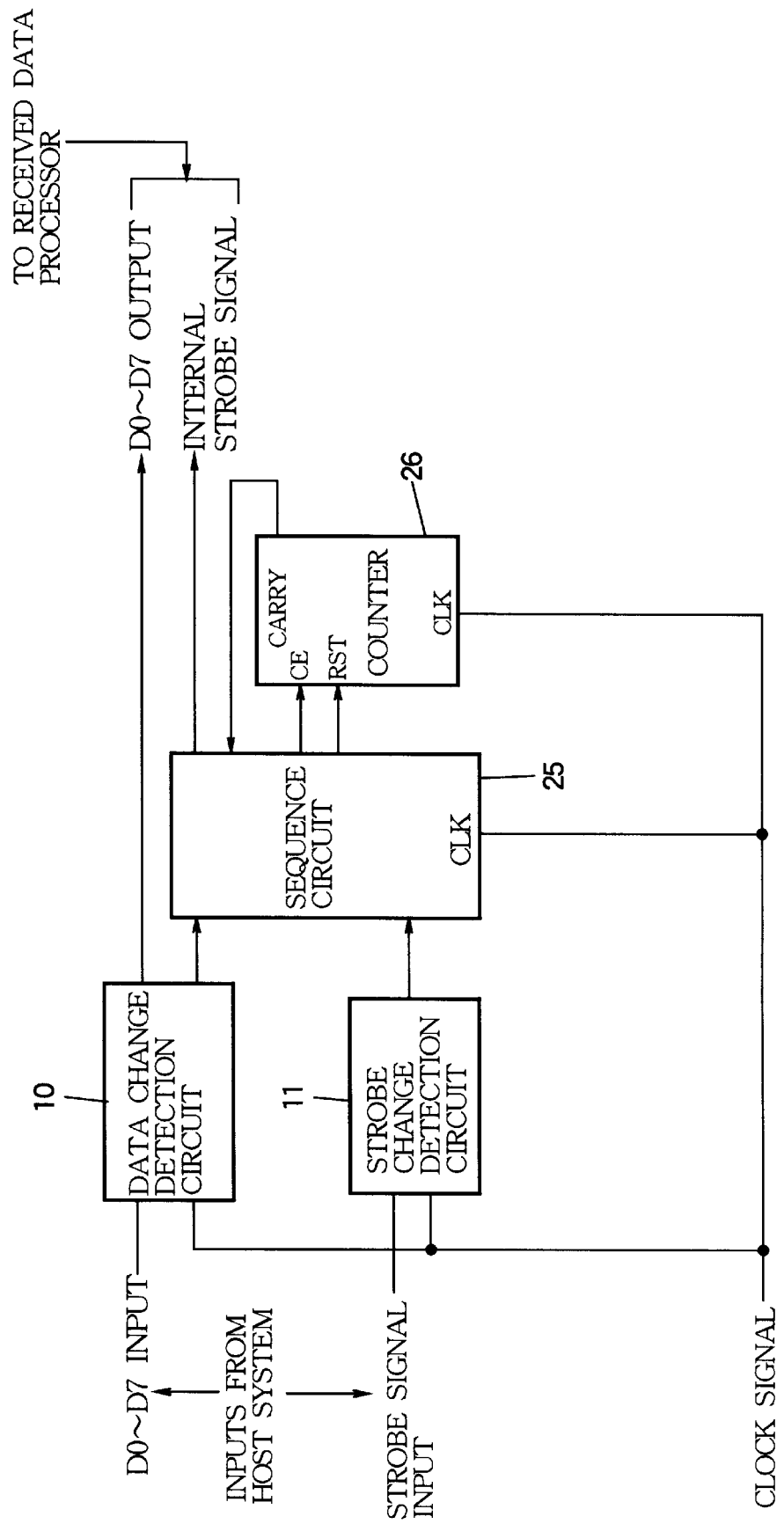
FIG. 7 is a block diagram of a pertinent part of a peripheral unit according to a third embodiment of the invention.

FIG. 7 is a block diagram showing the construction of a pertinent part of a peripheral unit according to the third embodiment of the invention. The two input AND gate 12 shown in FIG. 3 is replaced by a sequence circuit 25, and additionally a counter 26 is provided.

The sequence circuit 25 and the counter 26 operate in synchronism with a clock signal. The sequence circuit 25 receives outputs from the data change detection circuit 10 and the strobe change detection circuit 11, and a carry signal provided by counter 26, and outputs an internal strobe signal to a data receiver circuit (not shown), and also outputs a reset signal RST and a count enable signal CE to the counter 26.

The purpose of the counter 26 is to determine a data settling time after a change in the transfer data has terminated. By applying "1" to the counter 26 reset terminal RST, the count is reset to 0, and when "1" is applied to the count enable terminal CE, a counting operation is enabled. When the count in counter 26 reaches a specific value, the carry terminal CARRY changes to "1". When enabled, the counter 26 is incremented by the clocksignal.

Figure 8:
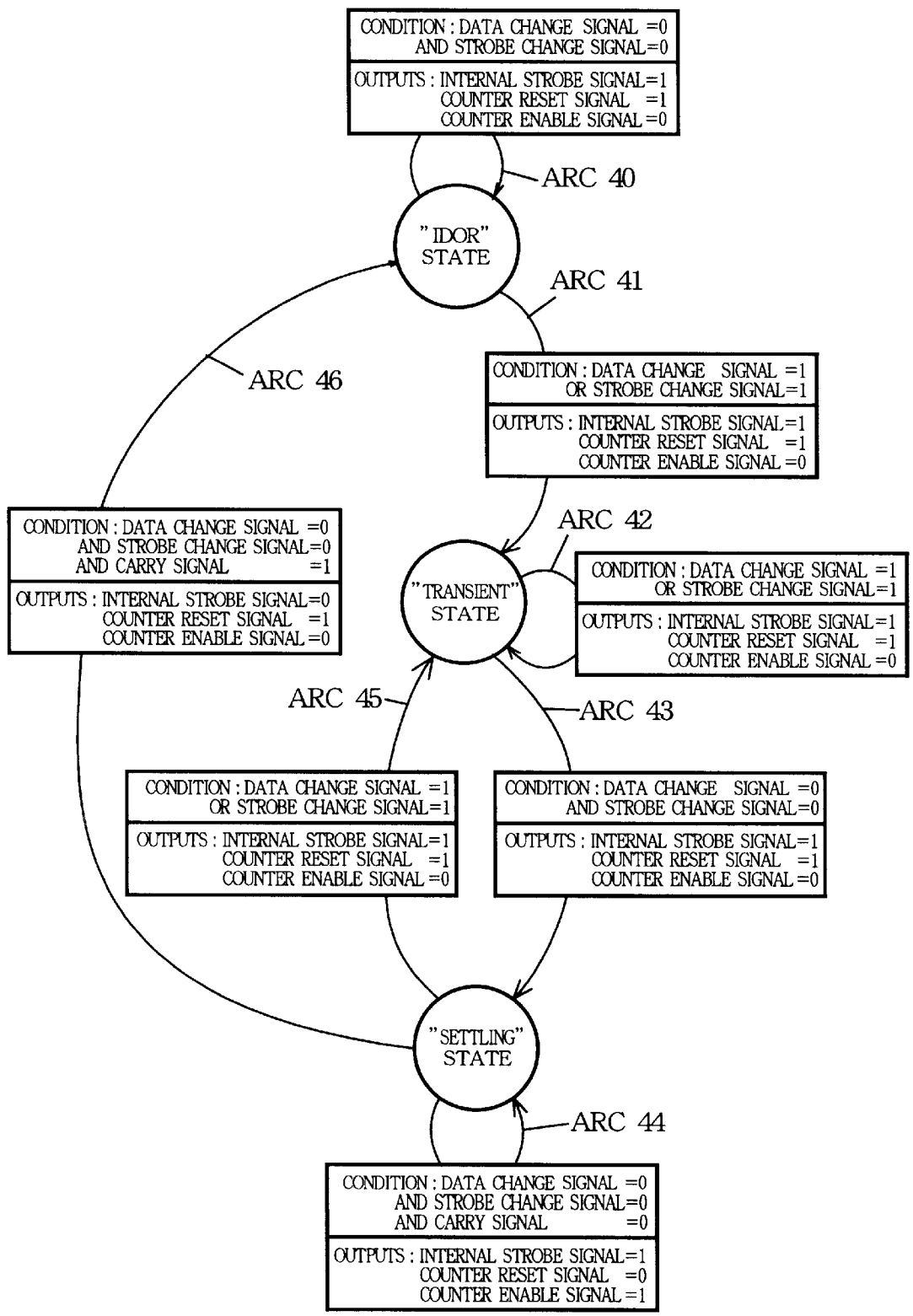
FIG. 8 is a state transition diagram of a sequence circuit according to the third embodiment of the invention.

FIG. 8 is a state transition diagram of the sequence circuit according to the third embodiment. A state is indicated in an area which is enclosed in a circle, and an arc with an arrow which joins states indicates a state transition. A description given in an rectangular frame above a partition line indicates a condition for the transition of the state to occur, while a description given in the rectangular frame below the partition line indicates the condition of output signals during the state transition. It is to be noted that the carry signal is neglected except for the settling state.

Initial condition: upon initialization, the sequence circuit 25 shifts to an idle state in which it waits for a change in either the data or the strobe signal.

Arc 40: when outputs from the data change detection circuit 10 and the strobe change detection circuit 11 are both "0" in the idle state, the idle state continues. At this time, the internal strobe signal is "1" (inactive), and the counter 26 is reset "1".

Arc 41: when either the output from the data change detection circuit 10 or the strobe change detection circuit 11 assumes "1" in the idle state, the sequence circuit 25 shifts to a transient state. At this time, the internal strobe signal is "1" (inactive), and the counter 26 is reset (RST=1).

Arc 42: when either the output from the data change detection circuit 10 or the strobe change detection circuit 11 is "1" in the transient state, the transient state is continued. At this time, the internal strobe signal is "1" (inactive), and the counter 26 is reset (RST=1).

Arc 43: when the outputs from the data change detection circuit 10 and the strobe change detection circuit 11 are both "0" in the transient state, the sequence circuit 25 shifts to the settling state. At this time, the internal strobe signal is "1" (inactive), and the counter 26 is reset (RST=1).

Arc 44: when the outputs from the data change detection circuit 10 and the strobe change detection circuit 11 are both "0" and the carry signal is also "0" in the settling state, the settling state is continued. At this time, the internal strobe signal is "1" (inactive), and the counter 26 is in its counting condition (CE=1, RST=0).

Arc 45: When either output from the data change detection circuit 10 or the strobe change detection circuit 11 is "1" in the settling state, the sequence circuit 25 returns to the transient state. At this time, the carry signal is ignored. The internal strobe signal is "1" (inactive), and the counter 26 is reset (RST=1).

Arc 46: When the outputs from the data change detection circuit 10 and the strobe change detection circuit 11 are both "0" and the carry signal is "1" in the settling state, or when a predetermined time has passed since the settling state is entered, the sequence circuit 25 shifts to the idle state. At this time, the internal strobe signal is "0" (active), commanding a subsequent data receiver circuit to latch data. The counter 26 is reset (RST=1).

Figure 9:
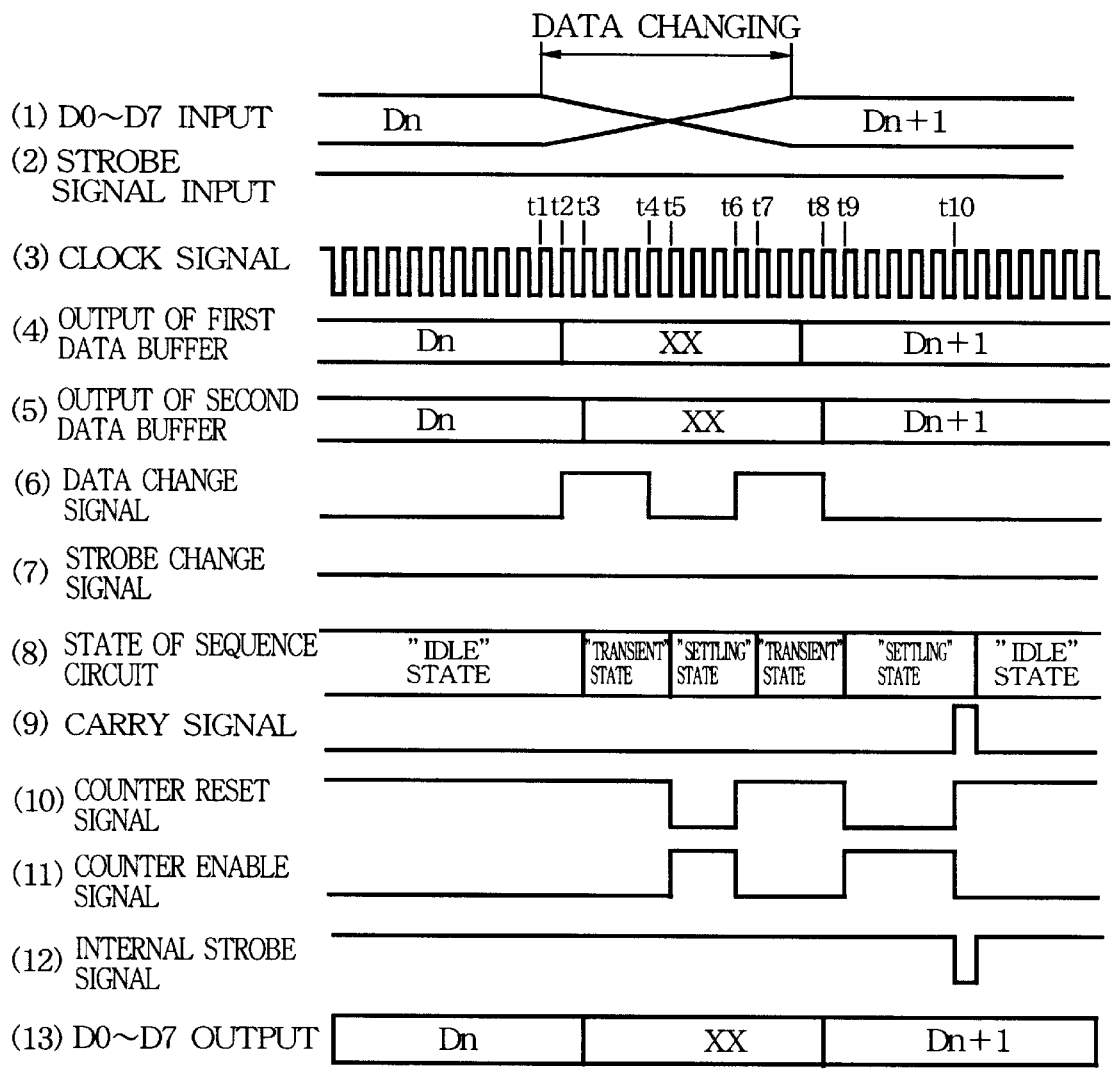
FIG. 9 is a series of timing charts illustrating the operation of the peripheral unit of the third embodiment of the invention.

The operation will now be described with reference to FIG. 9, which is a series of timing charts illustrating the operation of the peripheral unit according to the third embodiment. It will be noted that outputs from the data change detection circuit 10 and the strobe change detection circuit 11 are shown to be opposite from those shown in the first embodiment in FIG. 4, but, in this instance, the multiple input AND gate 16, the EXNOR gate 19 and the two input AND gate 12 illustrated in FIG. 3 may be replaced by a multiple input NAND gate, an EXOR gate and a two input NOR gate, respectively.

At time t1 the contents of transferred data begins to change, an output from the data change detection circuit 10 assumes a "1" at time t2, and an output from the strobe change detection circuit 11 is still "0" at time t2. Accordingly, at time t3, the sequence circuit 25 shifts to the transient state. At time t4, if successive data samples become equal to each other momentarily, even though the data is in the course of changing, an output from the data change detection circuit 10 becomes equal to "0", and hence at time t5, the sequence circuit 25 shifts to the settling state. At time t6, an output from the data change detection circuit 10 assumes a "1" before the carry signal assumes "1", whereby the sequence circuit 25 returns to the transient state at time t7. At time t8, when a change in the data is terminated, the sequence circuit 25 shifts to the settling state at time t9, the counter 26 beginning its counting operation. At time t10, when the counter 26 reaches a given value, the carry signal assumes a "1", whereupon the internal strobe signal is delivered.

With the third embodiment, an erroneous data sampling in the transition state is prevented even if a transition state of the data bus occurs within the peripheral unit and continues over several clock cycles.

Fourth Embodiment

The fourth embodiment is directed to preventing erroneous data samples from occurring in the event spike noises occur on the data line as a result of static electricity or reflections on a networks for example. It is generally recognized that upon occurrence of spike noises, the contents of transferred data or the strobe signal changes for a brief interval, and subsequently resumes its original condition. In the circuit arrangement of the fourth embodiment, such a sequence is detected and data sampling timing as caused by the spike noise is invalidated.

Figure 10:
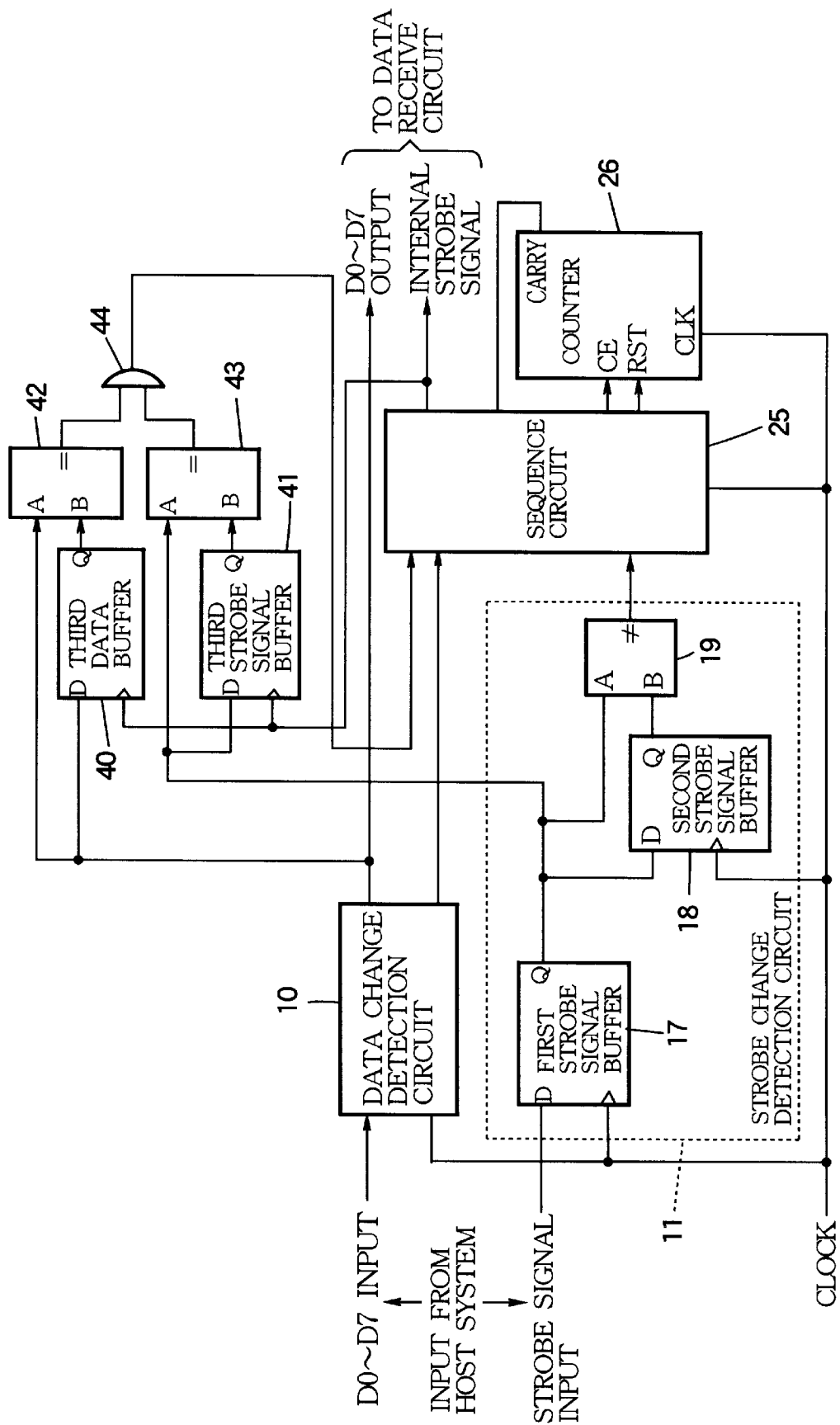
FIG. 10 is a block diagram showing the construction of a pertinent part of a peripheral unit according to a fourth embodiment of the invention.

FIG. 10 is a block diagram showing the construction of a pertinent part of a peripheral unit according to the fourth embodiment of the invention, in which a state resumption signal is added to one of the inputs to the sequence circuit 25 shown in the third embodiment. Specifically, in order to produce a state resumption signal, there are provided an 8-bit data buffer 40 serving as a third data buffer which stores a previous transferred data D0 to D7, a 1-bit data buffer 41 serving as a third strobe signal buffer, which stores the status of a previous strobe signal, an 8-bit comparator 42 which receives the contents of the current transferred data D0 to D7 and the contents of the previous transferred data D0 to D7, delivering a "1" upon coincidence therebetween, a 1-bit comparator 43 receiving the status of the current strobe signal and the status of the previous strobe signal, and delivering a "1" upon coincidence therebetween, an AND gate 44 for receiving outputs from the 8-bit comparator 42 and the 1-bit comparator 43 to form a logical product thereof and delivering it to the sequence circuit 25 as a state resumption signal.

The contents of the 8-bit data buffer 40 and the 1-bit data buffer 41 are updated in synchronism with the rising edge of the internal strobe signal which is output from the sequence circuit 25. The state resumption signal assumes a "1" upon coincidence between the contents of the previous and the current transferred data D0 to D7, and upon coincidence between the status of the previous and the current strobe signals which is indicative of a spike noise condition.

Figure 11:
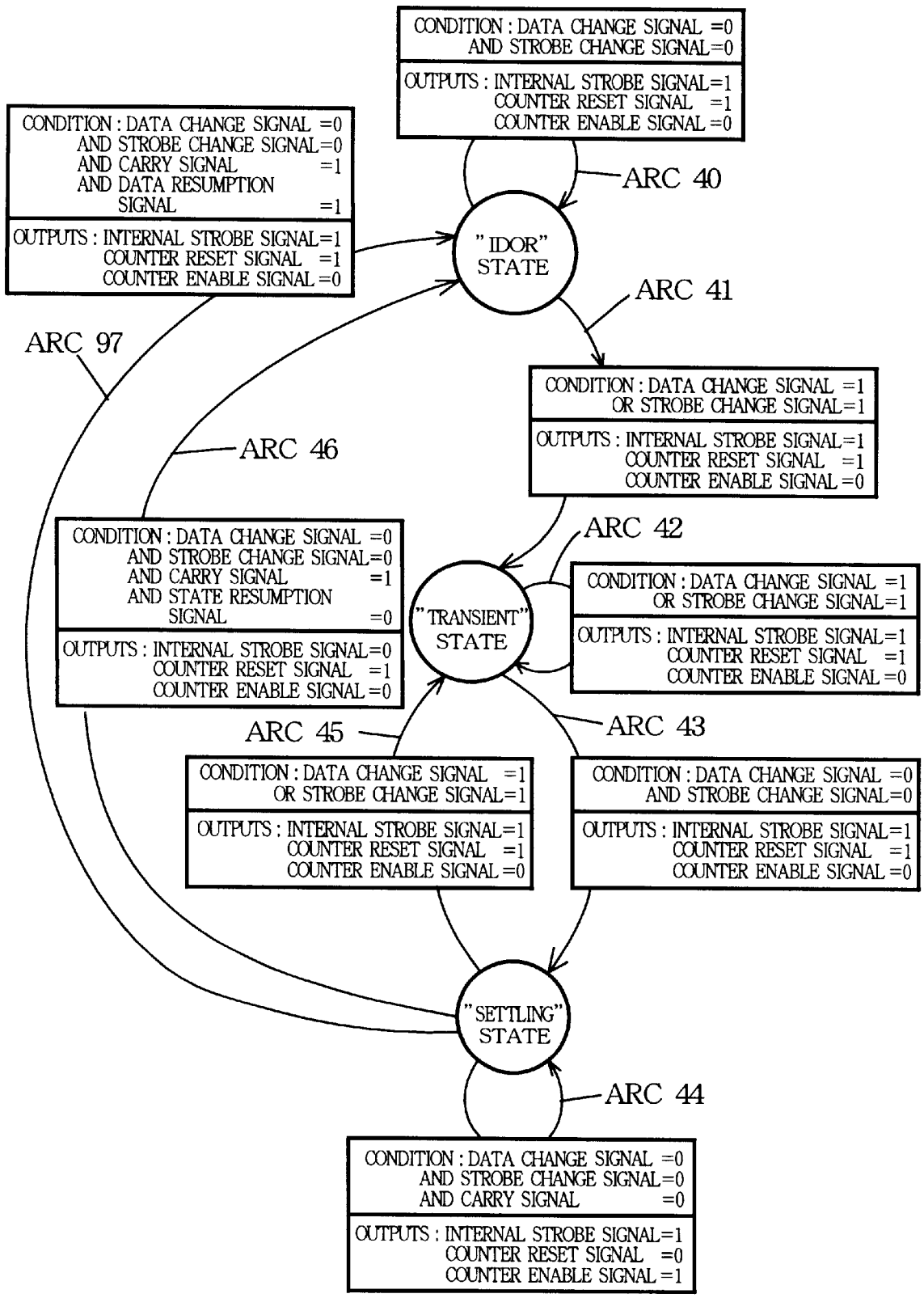
FIG. 11 is a state transition diagram of a sequence circuit according to the fourth embodiment of the invention.

FIG. 11 shows a state transition diagram of the sequence circuit 25 of the fourth embodiment. The fundamental operation remains the same as in the third embodiment shown in FIG. 8, except for the following:

Arc 46: in the third embodiment, when the outputs from the data change detection circuit 10 and the strobe change detection circuit 11 both remain "0" for a given time in the settling state, the carry signal assumes a "1" while the internal strobe signal assumes a "0", asserting a demand for data samples to the data receiver circuit. However, in the present fourth embodiment, an additional condition is that the state resumption signal assumes a "0".

Arc 97: this arc is added in the present fourth embodiment. In the arc 46, a normal reception of data causes the internal strobe signal to be delivered to terminate the sequence. By contrast, the arc 97 is effective to invalidate a series of transient state and settling state which initiated upon occurrence of the spike noise. Specifically, if outputs from the data change detection circuit 10 and the strobe change detection circuit 11 both assume a "0" for the given interval and the carry signal assumes "1", the internal strobe signal remains "1" as long as the state resumption signal is "1", and thus no demand for data samples is delivered to the data receiver circuit, and the sequence circuit 25 shifts to the idle state.

Figure 12:
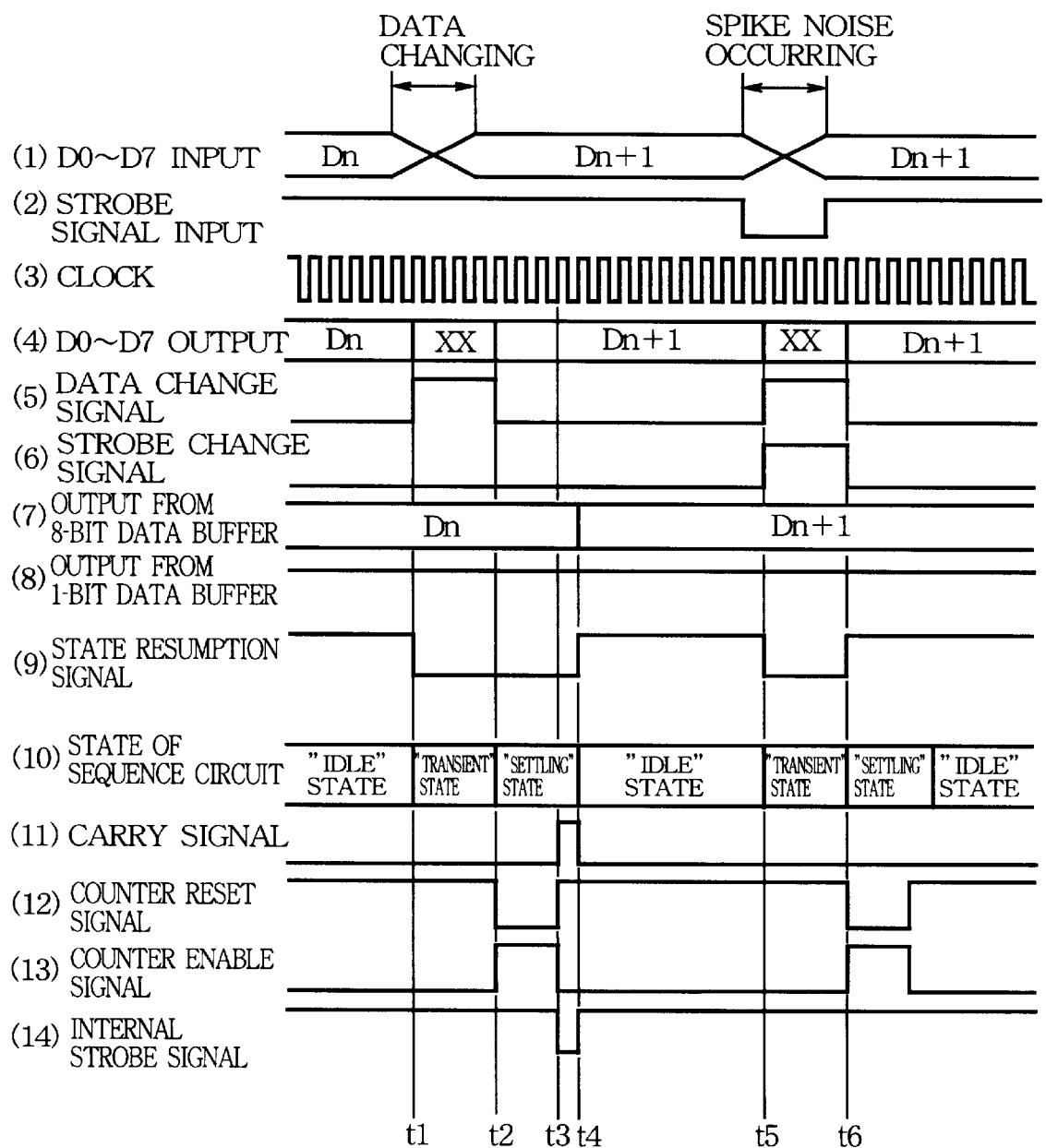
FIG. 12 is a timing chart illustrating the operation of the peripheral unit according to the fourth embodiment of the invention.

FIG. 12 is a timing chart illustrating the operation of a peripheral unit according to the fourth embodiment. Transferred data D0 to D7 undergo a change during an interval which is designated as "data changing" and momentarily change during an interval designated as "spike noise occurring", but subsequently resume an original condition.

During the interval designated as "data changing", an output from the data change detection circuit 10 assumes a "1" at time t1, but an output from the strobe change detection circuit 11 assumes a "0". The state resumption signal assumes a "0" since an output from the 8-bit comparator 42 assumes a "0" in response to a normal change in the data. The sequence circuit 25 shifts from the idle state to the transient state.

At time t2, when an output from the data change detection circuit 10 assumes a "0" and an output from the strobe change detection circuit 11 assumes a "0", the sequence circuit 25 shifts to the settling state. At the same time, the counter 26 is reset, beginning its counting operation. When a given time interval passes at time t3, the carry signal of "1" is delivered to the sequence circuit 25. The sequence circuit 25 delivers the internal strobe to the data receiver circuit in synchronism with the carry signal, and also updates the contents of the 8-bit data buffer 40 and the 1-bit data buffer 42 in response to the rising edge of the internal strobe at time t4. Since the output from the 8-bit comparator 42 assumes a "1", the state resumption signal assumes a "1". The sequence circuit 25 shifts from the settling state to the idle state.

During the interval of "spike noise occurring" however, an output from the data change detection circuit 10 assumes a "1" and an output from the strobe change detection circuit 11 also assumes a "1" at time t5. (The following discussion also applies when only one of the outputs from these detection circuits 10, 11 assumes a "1".) The state resumption signal assumes "0" since an output from the 8-bit comparator 42 assumes "0" in response to a change in the data. The sequence circuit 25 shifts from the idle state to the transient state.

At time t6, the spike noise is terminated, and outputs from the data change detection circuit 10 and the strobe change detection circuit 11 both again assume a "0" and the sequence circuit 25 shifts to the settling state. At the same time, since both the transferred data D0 to D7 and the strobe signal input before and after the occurrence of the spike noises remain the same, the outputs from the 8-bit comparator 42 and the 1-bit comparator 43 assume a "1", and hence the state resumption signal assumes a "1". The counter 26 is reset, and begins its counting operation. After a given time interval, the carry signal assumes a "1" and is delivered to the sequence circuit 25. Since the state resumption signal assumes "1", the sequence circuit 25 invalidates the carry signal, and thus shifts from the settling state to the idle state.

The fourth embodiment is effective to prevent an erroneous data sampling due to spike noise from occurring and thus to enable the transferred data to be recovered in an accurate manner in the event of a brief, sporadic spike noise occurring during the time the transferred data or the strobe signal is input.

Fifth Embodiment

Figure 13:
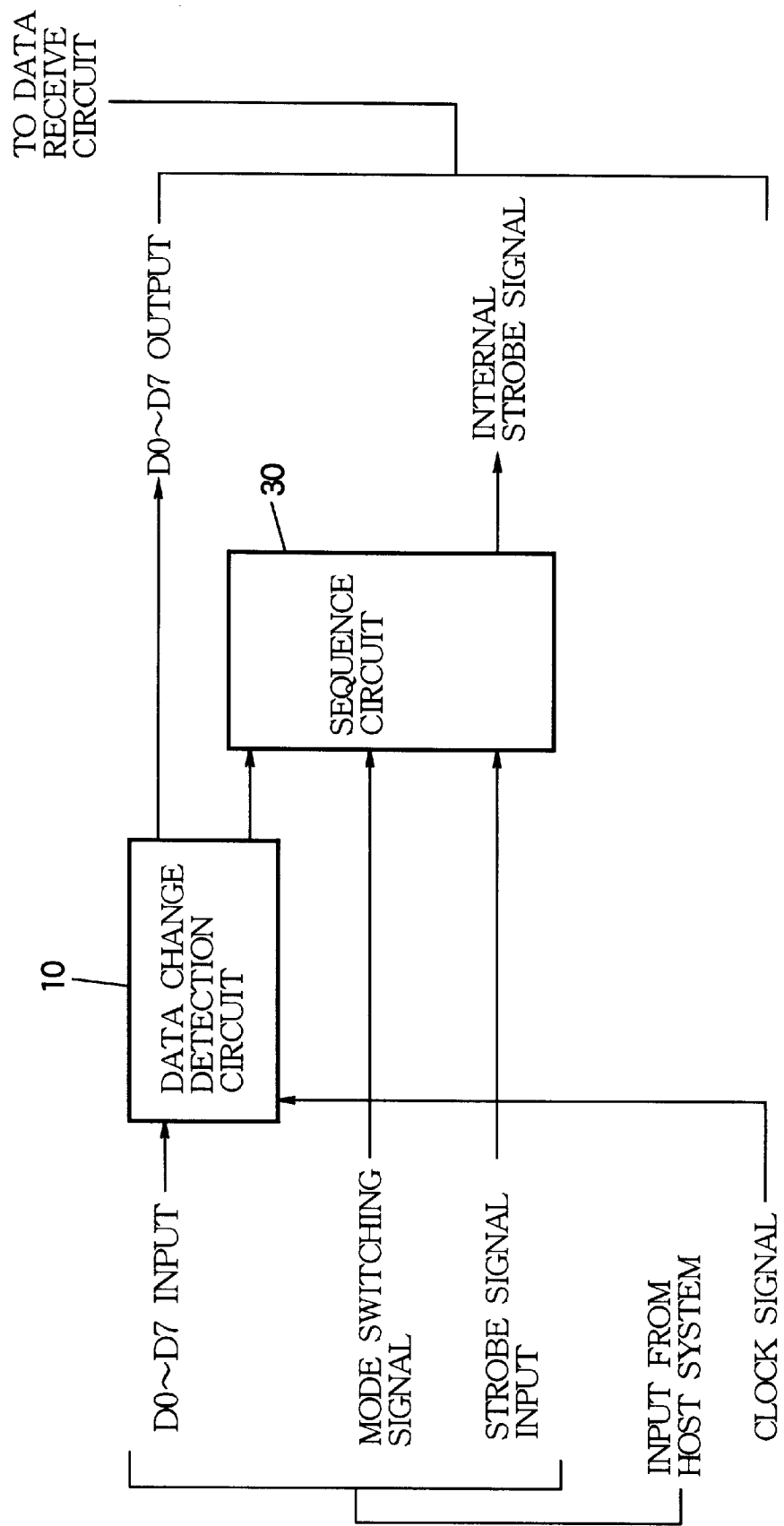
FIG. 13 is a block diagram showing the construction of a pertinent part of a peripheral unit according to a fifth embodiment of the invention.

A fifth embodiment allows the use of a Centro-interface. FIG. 13 is a block diagram showing the construction of a pertinent part of the peripheral unit according to the fifth embodiment in which the strobe change detection circuit 11 of the first embodiment shown in FIG. 3 is eliminated, and the two input AND gate 12 is replaced by a sequence circuit 30.

The sequence circuit 30 receives an output from the data change detection circuit 10, a mode switching signal and a strobe signal as inputs, and provides an internal strobe signal to a data receiver circuit, not shown. The mode switching signal is transmitted from a host system together with the strobe signal.

Figure 14:
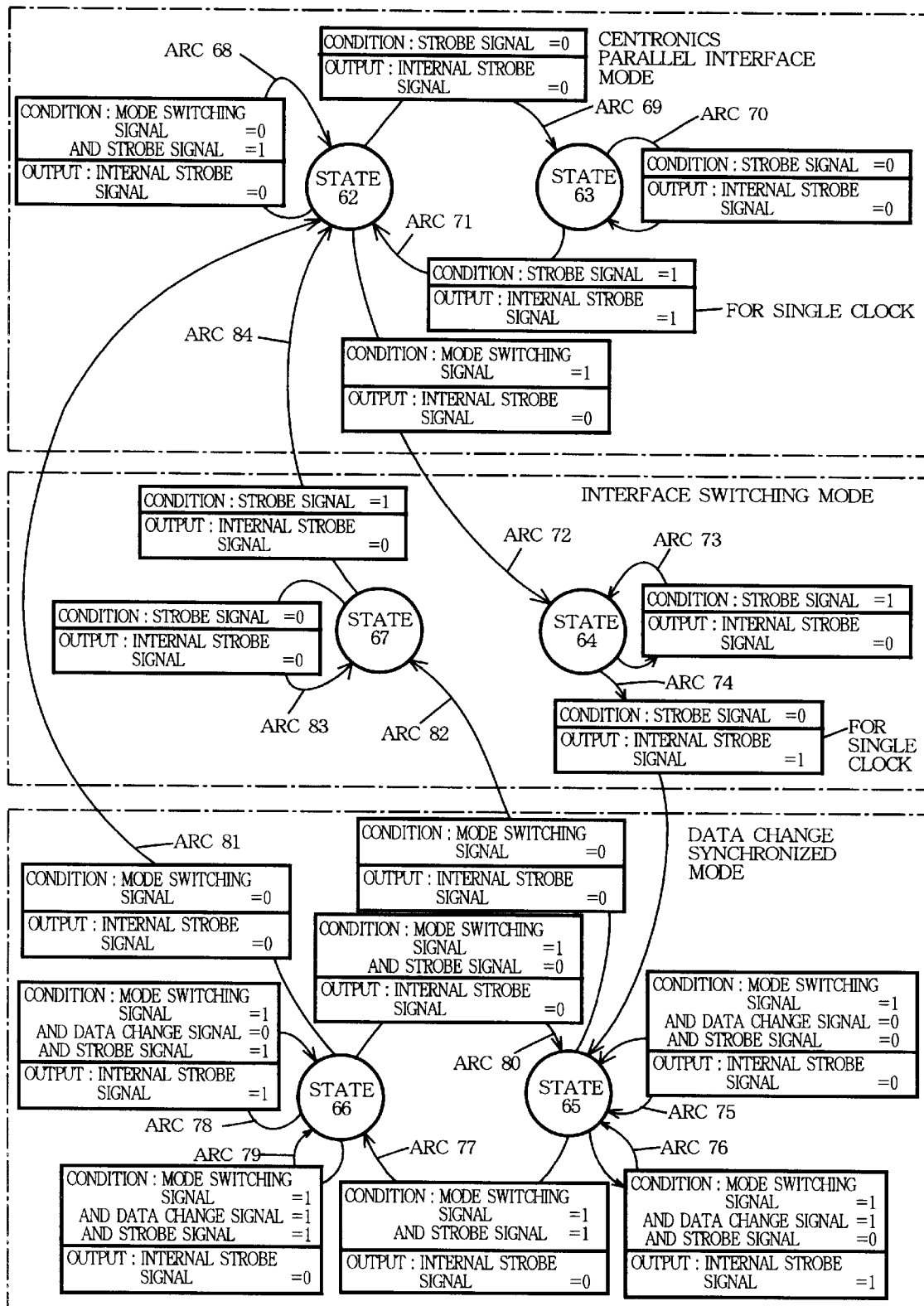
FIG. 14 is a state transition diagram of a sequence circuit according to the fifth embodiment of the invention.

FIG. 14 is a state transition diagram of the sequence circuit according to the fifth embodiment. An area enclosed in a circle represents a state, while an arc with an arrow which joins states represents a state transition. A description given in a rectangular frame above a partition line indicates a condition for a state transition to occur, while a description given in the rectangular frame below the partition line indicates the condition of output signals during the state transition. The operation of the sequence circuit can be categorized into three modes, including a Centronics parallel interface mode (hereafter referred to as Centro-mode), a data change synchronized parallel interface mode (hereafter data change synchronized mode) and an interface switching mode.

State 62: This represents an initial state of the sequence circuit 30, and the strobe signal assumes logic level "1" in the Centro-mode.

State 63: The strobe signal assumes logic level "0" in the Centro-mode.

State 64: When in this mode, during a shift from the Centro-mode to the data change synchronized mode, an output from the data change detection circuit is ignored, waiting for an inversion of the strobe signal.

State 65: This represents the data change synchronized mode in which the strobe signal assumes logic level "0".

State 66: This represents the data change synchronized mode in which the strobe signal assumes logic level "1".

State 67: A state during the shift from the data change synchronized mode to the Centro-mode in which the sequence circuit waits for an inversion of the strobe signal.

Arcs 68 to 71: These arcs indicate transitions in the Cento-mode. During this mode, the host system generates the strobe signal after changing the data to be transferred. The peripheral unit generates the internal strobe signal in synchronism with the rising edge of the strobe signal.

Arc 72: When the mode switching signal assumes logic level "1" at the state 62, the sequence circuit 30 shifts to the state 64.

Arc 73: When the strobe signal assumes logic level "1" in the state 64, the state 64 is continued.

Arc 74: When the strobe signal changes to logic level "0" in the state 64, a shift occurs to the state 65 (data change synchronized mode). At this time, the internal strobe signal assumes a logical "1".

Arcs 75 to 80: These arcs indicate the operation during the data change synchronized mode. In this mode, the peripheral unit generates the internal strobe signal according to the output of the data change detection circuit 10 and the strobe signal.

Arc 75: when output from the data change detection circuit 10 is a logical "0" and the strobe signal is a logical "0" in the state 65, the state 65 continues. At this time, the internal strobe signal is a logical "0".

Arc 76: when output from the data change detection circuit 10 is logic level "1" and the strobe signal is logic level "0" in the state 65, the sequence circuit 30 sets the internal strobe signal to logic level "1" and continues the state 65.

Arc 77: when the strobe signal becomes logic level "1" in the state 65, the sequence circuit 30 proceeds to the state 66. At this time the internal strobe signal is logic level "0".

Arc 78: when output from the data change detection circuit 10 is a logical "0" and the strobe signal is a logical "1" in the state 66, the sequence circuit 30 sets the internal strobe signal to a logical "1" and continues the state 66.

Arc 79: when output from the data change detection circuit 10 is logic level "1" and the strobe signal is logic level "1" in the state 66, the state 66 continues. At this time, the internal strobe signal is logic level "0".

Arc 80: when the strobe signal becomes a logical "0" in the state 66, the sequence circuit 30 proceeds to the state 65. At this time, the internal strobe signal is a logical "0".

Arc 81: When the node switching signal becomes logic level "0" in the state 66 (data change synchronized mode), the sequence circuit 30 shifts to the state 62 (Centro-mode).

Arc 82: When the mode switching signal becomes logic level "0" in the state 65 (data change synchronized mode), the sequence circuit 30 shifts to the state 67.

Arc 83: The state 67 is continued as long as the strobe signal assumes a logical "0" in the state 67 (interface switching mode).

Arc 84: When the strobe signal assumes logic level "1" in the state 67 (interface switching mode), a transfer occurs to the state 62.

Figure 15:
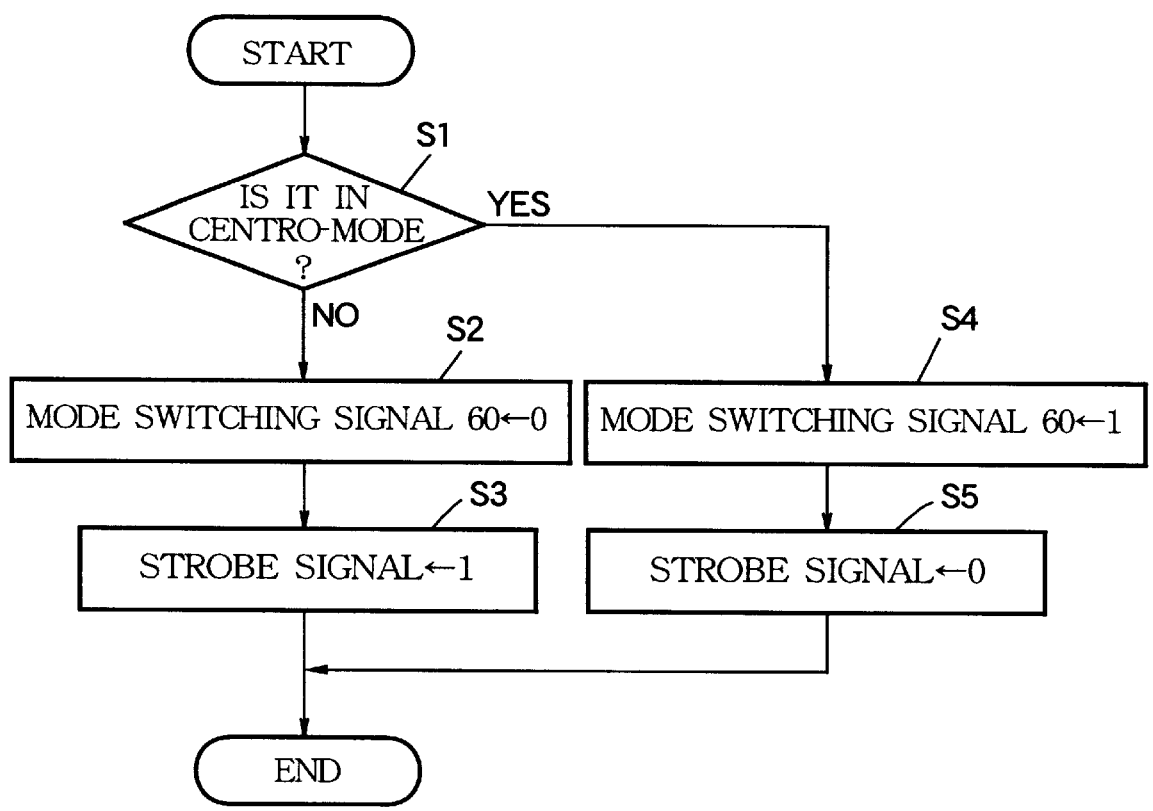
FIG. 15 is a flow chart illustrating the operation of a host system according to the fifth embodiment.

FIG. 15 is a flow chart illustrating a mode switching command operation in a host system according to the fifth embodiment. At decision step S1, an examination is made to see if the current mode is the Centro-mode or not. If it is the Centro-mode (yes), the operation branches to step S4, but if not (no), the operation proceeds to step S2. At step S2, the mode switching signal is made logic level "0", and at step S3, the strobe signal is made logic level "1". As a consequence, a switching occurs from the data change synchronized mode to the Centro-mode. At step S4, the mode switching signal is made logic level "1" while at step S5, the strobe signal is made logic level "0". As a consequence, a switching occurs from the Centro-mode to the data change synchronized mode.

Figure 16:
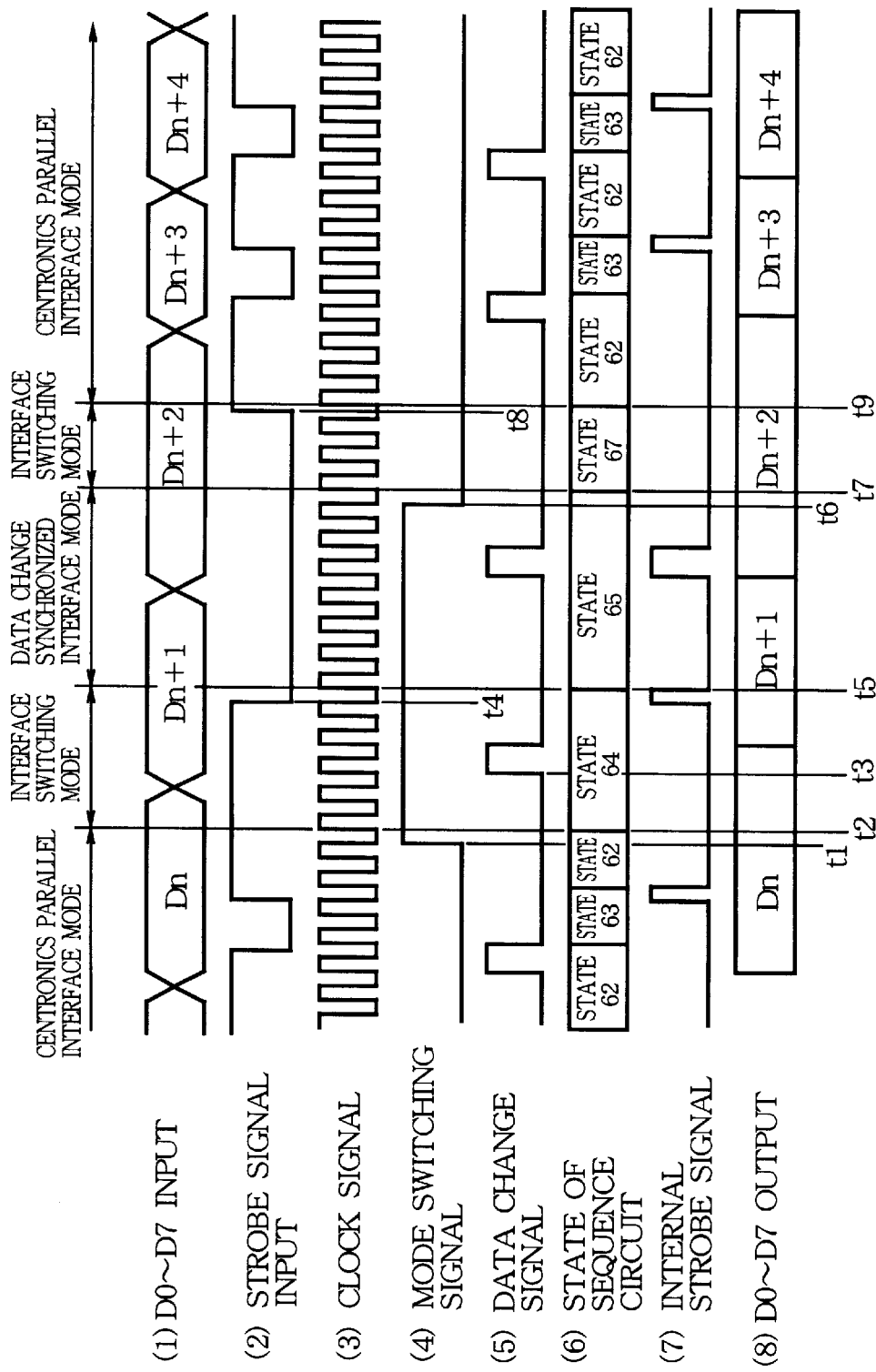
FIG. 16 is a timing chart illustrating the operation of the peripheral unit according to the fifth embodiment of the invention.

FIG. 16 is a timing chart illustrating the operation of a peripheral unit according to the fifth embodiment. At time t1 when the mode switching signal assumes logic level "1", the sequence circuit 30 shifts from the state 62 (Centro-mode) to the state 64 (interface switching mode) at time t2. At time t3, an output from the data change detection circuit 10 assumes logic level "1", but is ignored. After the strobe signal assumes logic level "0" at time t4, the sequence circuit 30 shifts from the state 64 (interface switching mode) to the state 65 (data change synchronized mode) at time t5. Upon shifting to the data change synchronized mode, the sequence circuit 30 outputs an internal strobe signal, which is synchronized with an output from the data change detection circuit 10, to a data receiver circuit.

After the mode switching signal assumes logic level "0" at time t6, the sequence circuit 30 shifts from the state 65 (data change synchronized mode) to the state 67 (interface switching mode) at time t7. When the strobe signal assumes logic level "1" at time t8, the sequence circuit 30 shifts from the state 67 (interface switching mode) to the state 62 (Centro-mode) at time t9. Upon shifting to the Centro-mode, the sequence circuit 30 invalidates an output from the data change detection circuit 10, and delivers an internal strobe signal, which is synchronized with the strobe signal, to a data receiver circuit.

In the fifth embodiment, the interface switching mode allows a mode conversion between the Centro-mode and the data change synchronized mode, thus allowing a combined use of both the Centro-mode and the data change synchronized mode.

Sixth Embodiment

Figure 17:
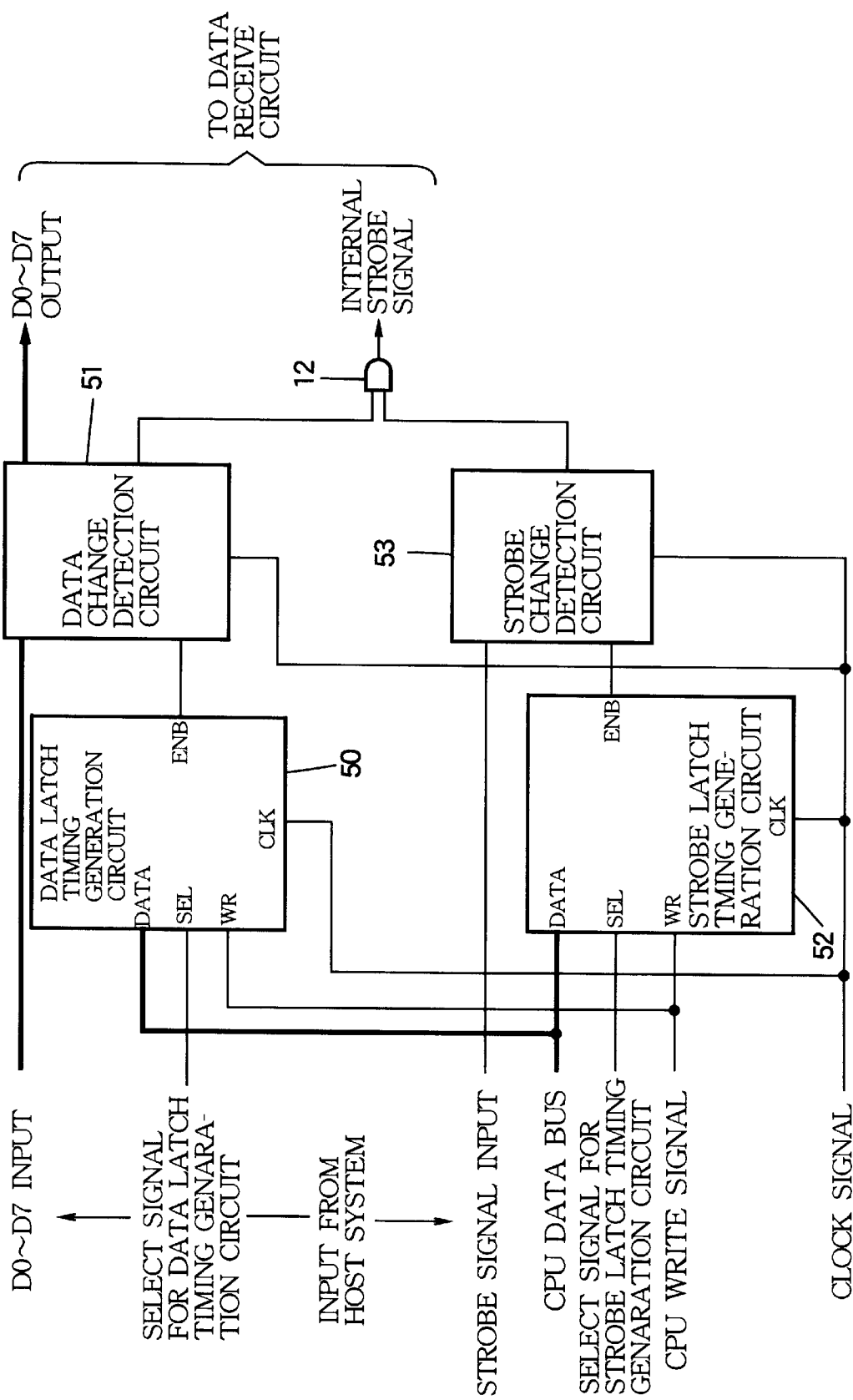
FIG. 17 is a block diagram showing the construction of a pertinent part of a peripheral unit according to a sixth embodiment of the invention.

FIG. 17 is a block diagram showing the construction of a pertinent part of a peripheral unit according to a sixth embodiment of the invention.

An internal strobe signal generation circuit comprises a data latch timing generation circuit 50, a data change detection circuit 51, a strobe latch timing generation circuit 52, a strobe change detection circuit 53, and a two input AND gate 12 which receives outputs from the data change detection circuit 51 and the strobe change detection circuit 53 and delivers an internal strobe signal.

The data latch timing generation circuit 50 receives data from a CPU data bus, a CPU write signal(WR), a clock signal (CLK) and a select signal (SEL) which selects the data latch timing generation circuit 50, and delivers a data enable signal ENB. The data latch timing generation circuit 50 is selected by the select signal (SEL) from the CPU, not shown, and operates as a clock frequency division circuit. This circuit has a division factor n which can be written therein by data supplied through the CPU data bus and the CPU write signal, (WR) thus delivering logic level "1" for one period of the clock signal every n clocks, and delivering logic level "0" at other times.

The data change detection circuit 51 is similar to the data change detection circuit 10 of the first embodiment shown in FIG. 3, to which a data enable signal input circuit is added. The data change detection circuit 51 is fed with data input signals D0 to D7 from a host system, not shown, and the data enable signal input terminal is connected to the ENB output terminal of the data latch timing generation circuit 50.

The strobe latch timing generation circuit 52 receives data from the CPU data bus, the CPU write signal (WR), the clock signal (CLK) and a select signal (SEL) which selects the strobe latch timing generation circuit 52, and outputs a strobe enable signal ENB.

The strobe change detection circuit 53 is similar to the strobe change detection circuit 11 of the first embodiment shown in FIG. 3, to which a strobe enable signal input terminal is added. The strobe change detection circuit 53 is fed with a strobe signal input, and the strobe enable signal input terminal is connected to the ENB output terminal of the strobe latch timing generation circuit 52. The strobe latch timing generation circuit 52 is selected by a select signal (SEL) from the CPU, not shown, and operates as a clock frequency division circuit. This circuit has a division factor n which can be written therein by data supplied through the CPU data bus and the CPU write signal (WR), thus delivering logic level "1" for one period of the clock signal every n clocks and delivering logic level "0" at other times.

An output from the data change detection circuit 51 and an output from the strobe change detection circuit 53 are provided to the two input AND gate 12, which outputs an internal strobe signal. The internal strobe signal and data output signal D0 to D7 from the data change detection circuit 51 are provided to a data receiver circuit, not shown.

Figure 18:
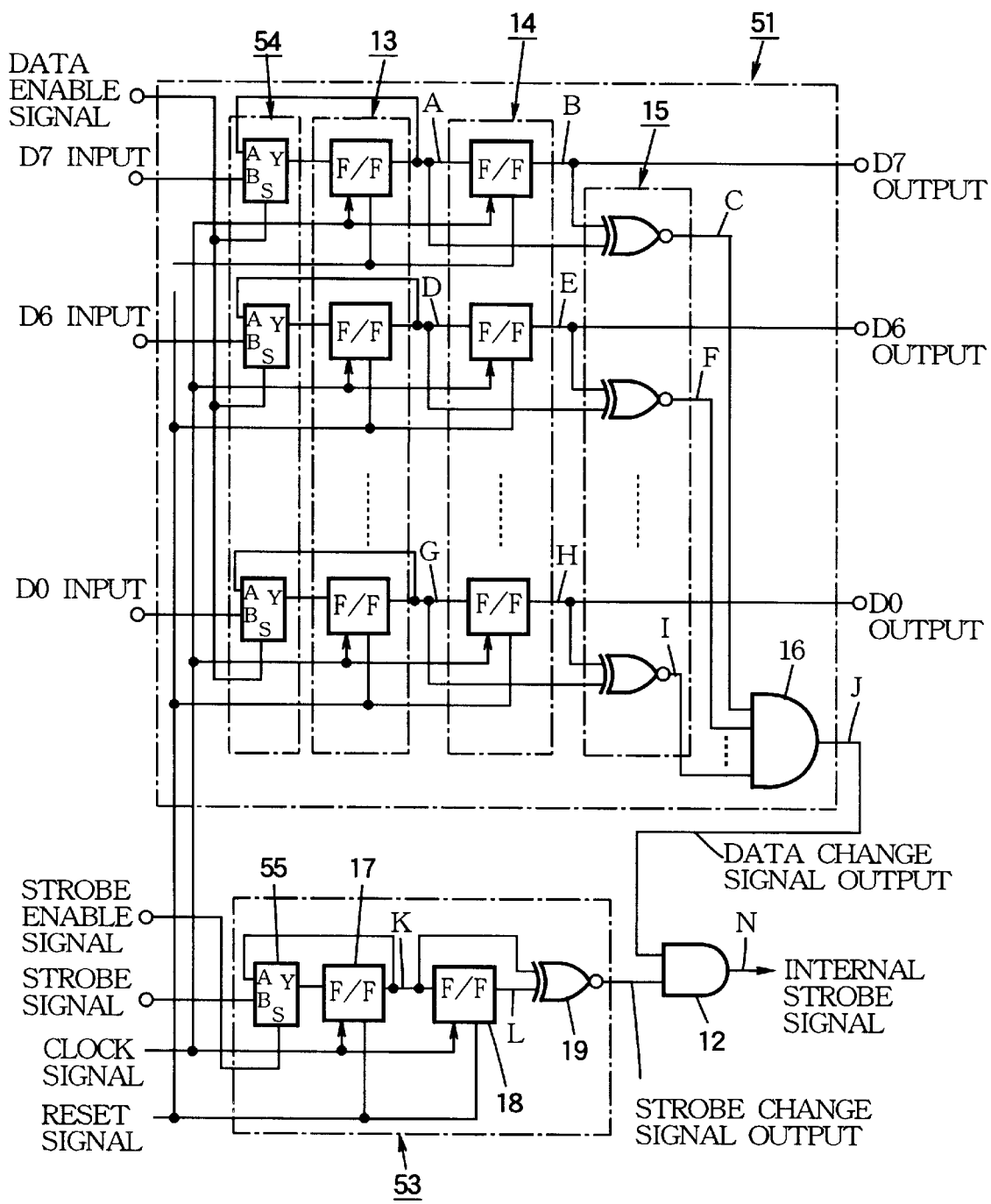
FIG. 18 is a block diagram showing the construction of another pertinent part of the peripheral unit of the sixth embodiment of the invention.

FIG. 18 is a circuit diagram of a pertinent part of a peripheral unit according to the sixth embodiment. It is to be noted that in FIG. 18, parts identical or equivalent to those shown in FIG. 3 are designated by like reference numerals and characters.

The data change detection circuit 51 includes data signal input terminals D0 to D7, which are connected to the respective B terminals of a selection circuit 54 separately for each bit. A timing signal which is fed from the data enable signal input terminal (ENB) is supplied to each respective S terminal of the selection circuit 54. The selection circuit 54 also includes an output Y for each of the respective bits, which is fed to the first data buffer 13, the output of which is then fed to the second data buffer 14 for each of the respective bits and is also fed back to the respective A terminals of the selection circuit 54.

The selection circuit 54 outputs a value which is present at the A terminal which is the current contents of the first data buffer 13, when an input to the S terminal assumes logic level "0", thus maintaining the value stored in the first data buffer 13. When an input applied to the S terminal of the selection circuit 54 assumes logic level "1", the selection circuit 54 outputs a value which is present at its B terminal which is the transferred data D0 to D7 supplied from the host system, thus updating the contents of the first data buffer 13.

The data change detection circuit 51 also includes a plurality of EXNOR gates 15, each of which receives the contents of a respective F/F of the first data buffer 13 and the second data buffer 14, and outputs a logic level "1" when both inputs are either "1" or "0", and a multiple input AND gate 16 which receives individual outputs from the EXNOR gates 15 to form a logical product, thus outputting a data change signal (J) upon detection of a change in the contents of the transferred data D0 to D7.

The strobe change detection circuit 53 has a strobe signal input terminal which is connected to a B terminal of the selection circuit 55, and also a strobe enable signal input terminal which is connected to the S terminal of the selection circuit 55. The selection circuit 55 has an output Y which feeds a first strobe signal buffer 17, an output of which feeds a second strobe signal buffer 18 and also is fed back to the A terminal of the selection circuit 55. When an input applied to the S terminal assumes logic level "0", the selection circuit 55 delivers a value which is input to the A terminal which is the current contents of the first strobe signal buffer 17, thus maintaining the value stored in the first strobe signal buffer 17. When the input applied to the S terminal of the selection circuit 55 assumes logic level "1", the selection circuit 55 delivers the value which is input to the B terminal, i.e., the strobe signal which is delivered from the host system, thus updating the contents of the first strobe signal buffer 17. In addition, the strobe change detection circuit 53 includes an EXNOR gate 19 which receives the contents of the first strobe signal buffer 17 and the contents of the second strobe signal buffer 18, and outputs logic level "1" when both inputs are either "1" or "0", thus outputting a strobe change signal upon detection of an inversion of the strobe signal.

The two input AND gate 12 receives the output from the multiple input AND gate 16 and the output from the EXNOR gate 19 to form a logical product thereof, thus outputting an internal strobe signal. Since a host system does not invert the strobe signal when there is a change in the contents of the transferred data D0 to D7, but inverts the strobe signal when there is no change in the contents of the transferred data D0 to D7, it will be seen that the internal strobe signal generation circuit detects a change in the contents of the transferred data D0 to D7 by means of the data change detection circuit 51 in the absence of an inversion of the strobe signal, and in the event an inversion of the strobe signal is present, detects an inversion of the strobe signal by the strobe change detection circuit 53, thus delivering an internal strobe signal.

Figure 19:
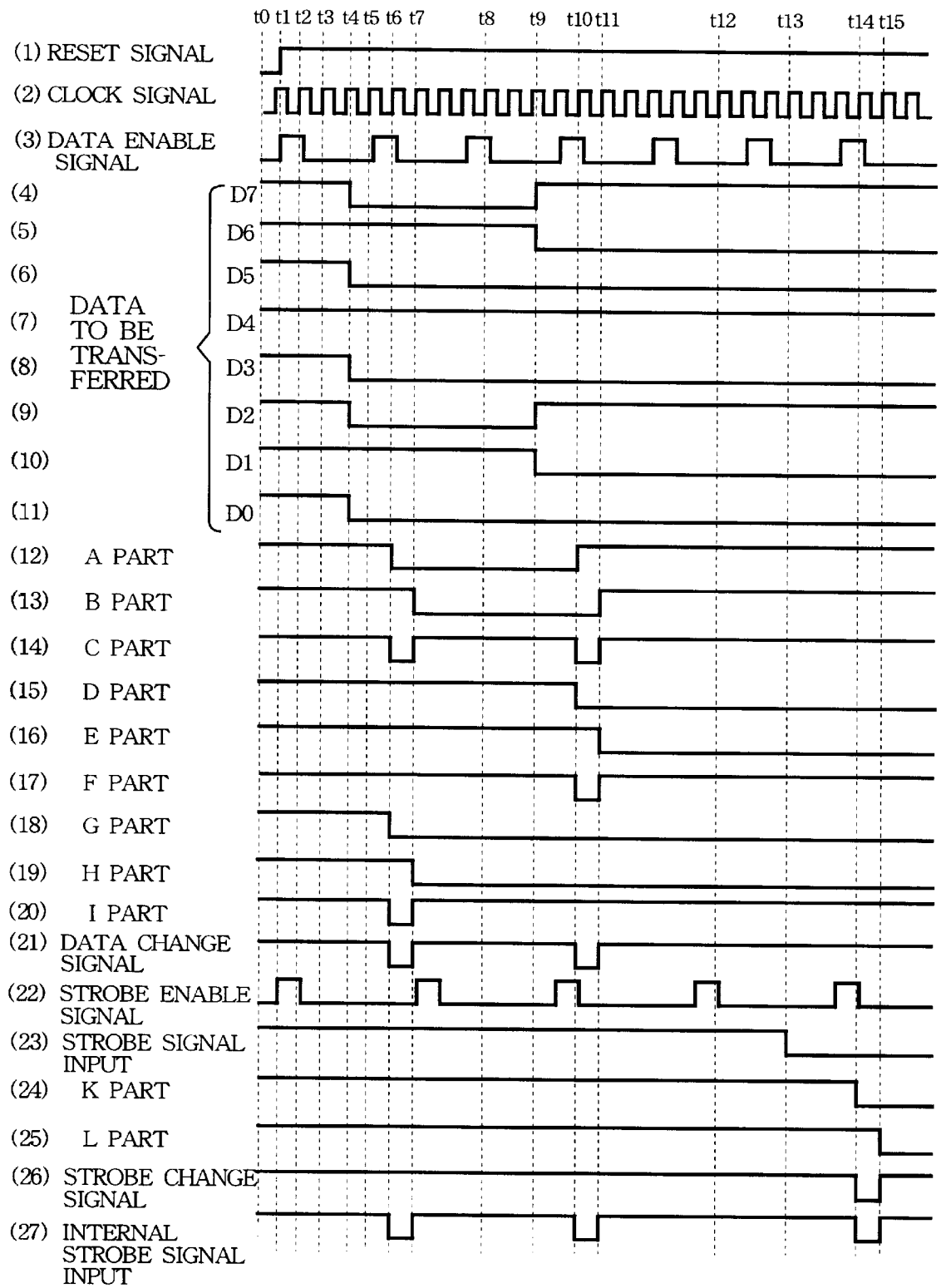
FIG. 19 is a timing chart illustrating the operation of the peripheral unit of the sixth embodiment of the invention.

FIG. 19 is a timing chart illustrating the operation of the peripheral unit according to the sixth embodiment, which will be described below with reference to FIGS. 17 and 18. A reset signal, a clock signal, the data enable signal, transferred data D0 to D7, and outputs from the first data buffer 13, the second data buffer 14, the EXNOR gate 15, the multiple input AND gate 16 (its output being a data change signal), a strobe enable signal, the strobe signal, and outputs from the first strobe signal buffer 17, the second strobe signal buffer 18, the EXNOR gate 19 (its output being a strobe change signal) and the two input AND gate 12 (its output being the internal strobe signal) are shown at (1) to (27) in FIG. 19. However, it is to be noted that the first data buffer 13, the second data buffer 14 and the EXNOR gates 15 are shown as maintaining only transferred data D7, D6 and D0 to conform to the illustration in FIG. 18. It is also to be noted that the data latch timing generation circuit 50 is shown as providing a frequency division factor of 4 at (3) and the strobe latch timing generation circuit 52 is shown as having a frequency division factor of 6 at (22) in FIG. 19.

At time t0 when the power supply of the peripheral unit is turned on, the reset signal causes the first and the second data buffers 13, 14, the EXNOR gate 15, the multiple input AND gate 16, the first and the second strobe signal buffers 17, 18, the EXNOR gate 19 and the two input AND gate 12 to deliver logic level "1" outputs. Since the strobe signal input (23) is not inverted from time t0 to a point which is immediately before time t13, during that time, the contents of the first strobe signal buffer 17 or K-part (24) and the contents of the second strobe signal buffer 18 or L-part (25) remain logic level "1", outputting logic level "1" as the strobe change signal (26) which is output from the EXNOR gate 19, and also outputting logic level "1" as the internal strobe signal (27) except when there is a change in data.

At time t1, when the reset signal is terminated, the data enable signal (3) and the strobe enable signal (22) are output at a logic level "1" changing level at a given period according to the frequency division factors which are set up by the data latch timing generation circuit 50 and the strobe latch timing generation circuit 52.

At time t2, the data enable signal (3) is logic level "1" so that "1" is input to the S terminal of the selection circuit 54, and accordingly, an input to the B terminal, i.e., the transferred data, is directly output to the terminal Y. An initial value of the transferred data is latched in the first data buffer 13 in response to the rising edge of the clock signal (2). Similarly, the strobe enable signal (22) is also logic level "1", so that "1" is input to the S terminal, i.e. of the selection circuit 55, and accordingly, an input to the B terminal or the strobe signal, is directly output to the terminal Y, and an initial value of the strobe signal is latched in the first strobe signal buffer 17 in response to the rising edge of the clock signal (2). However, there is no change in either the transferred data or the strobe signal, and hence the data change signal (21) and the strobe change signal (26) both one logic level "1", whereby the internal strobe signal (27), which represents an output from the two input AND gate 12, is logic level "1".

At time t3, which corresponds to the rising edge of the next clock signal (2), the data enable signal (3) and the strobe enable signal (22) are both logic level "0", and are applied to the S terminals of the selection circuits 54 and 55, respectively, whereby the current value which is stored in the first data buffer 13 is directly delivered at the output of the selection circuit 54 to maintain the contents of the first data buffer 13, while the current value stored in the first strobe signal buffer 17 is delivered at the output of the selection circuit 55 to maintain the contents of the first strobe signal buffer 17. The output from the first data buffer 13 is now stored in the second data buffer 14, and the output from the first strobe signal buffer 17 is now stored in the second strobe signal buffer 18. Since the contents of the first data buffer 13 equal the contents of the second data buffer 14 for each of bits at this time, the data change signal (21) remains logic level "1". Since the strobe change signal (26) also remains logic level "1", the internal strobe signal (27) which represents the output from the two input AND gate 12 remains logic level "1".

At time t4, certain signals in the transferred data, namely, D7(4), D5(6), D3(8), D2(9) and D0(11) are changed, but at time t5 which corresponds to the rising edge of the next following clock signal (2), the data enable signal (3) is logic level "0" and therefore, the output from the two input AND gate 12 does not change, and accordingly, the contents of the first data buffer 13 remains unchanged.

At time t6, which corresponds to the rising edge of the next following clock signal (2), the data enable signal (3) assumes logic level "1", and the contents of the first data buffer 13, corresponding to each of the bits of the transferred data which has undergone a change, namely D7(4), D5(6), D3(8), D2(9) and D0(11), change from logic level "1" to "0" (see A-part (12) and G-part (18)). At this time, the contents of the second data buffer 14 remains "1" (see B-part (13) and H-part (19)). The outputs from the respective EXNOR gates 15 corresponding to each of the bits in the first data buffer 13 which have undergone a change from logic level "1" to "0" change from logic level "1" to "0" (see C-part (14) and I-part (20)). At this time, the strobe change signal (26) remains logic level "1", but an output (J) from the multiple input AND gate 16 which forms a logical product of the outputs from all the EXNOR gates 15, and is the data change signal (21), assumes logic level "0", whereby the two input AND gate 12 outputs logic level "0" as the internal strobe signal (27).

In response to the rising edge of the clock signal (2) at time t7, the contents of the first data buffer 13 one latched in the second data buffer 14. At this time, inputs to the EXNOR gates 15 corresponding to the respective bits of the transferred data, namely, the output from the first data buffer 13 and the output from the second data buffer 14, become equal to each other, and accordingly all the EXNOR gates 15 output logic level "1". Hence, the output from the multiple input AND gate 16 which forms a logical product of the outputs from all the EXNOR gates 15, and is the data change signal (21) assumes logic level "1". Since the strobe change signal (26) from the EXNOR gate 19 assumes logic level "1" as at time t6, the internal strobe signal (27) which represents the output from the two input AND gate 12 assumes logic level "1".

At time t8, the data enable signal (3) assumes logic level "1", but since there is no change in the transferred data (4) to (II), C-part (14), F-part (17) and I-part (20), which represent outputs from the three illustrated EXNOR gates 15, are logic level "1", and the output (21) of the multiple input AND gate 16 which forms a logical product of the outputs from all the EXNOR gates 15 assumes logic level "1". Since the strobe change signal (26) also logic level "1", the internal strobe signal remains logic level "1".

Subsequently, values of D7(4), D6(5), D2(9) and D1(10) in the transferred data which have undergone a change at time t9 are latched in the first data buffer 13 in response to the rising edge of the clock signal (2) occurring at time t10 when the data enable signal (3) assumes a logic level "1", and is then latched in the second data buffer 14 in response to the rising edge of the next clock signal (namely, time t11), in much the same way as occurred at time t4, and times t6 and t7. Accordingly, an output from any EXNOR gate 15 corresponding to a bit in the transferred data which has undergone a change as a result of different contents between the first and the second data buffers 13, 14, assumes logic level "0" (see C-part (14) and F-part (17)). In this manner, the output (21) from the multiple input AND gate 16 which forms a logical product of all the EXNOR gates 15 for every bit assumes logic level "0", and the output (27) from the two input AND gate 12 also assumes logic level "0", thus producing the internal strobe signal (27).

At and subsequent to time t11, there is no change in the transferred data D0 to D7 or in the contents of both the first and second data buffers 13 and 14, and accordingly, the outputs (14), (17), and (20) from the illustrated EXNOR gates 15, and the output from the multiple input AND gate 16. Therefore the data change signal (21) continues to be logic level "1".

At time t12, the strobe enable signal (22) is logic level "1", but because the strobe signal is not inverted, there is no change in the contents of the first strobe signal buffer 17 or K-part (24), nor in the contents of the second strobe signal buffer 18 or L-part (25). Accordingly, the output of the EXNOR gate 19, i.e., or the strobe change signal (26) is logic level "1". Accordingly, the logical product of the data change signal (21) and the strobe change signal (26) is logic level "1", thus outputting the internal strobe signal (27) (or the output from the two input AND gate 12) of logic level "1".

As when a change occurs in the transferred data, the strobe signal input (23) which is inverted at time t13 is latched into the first strobe signal buffer 17 in response to the rising edge of the clock signal (2) which occurs at time t14 when the strobe enable signal (22) is logic level "1", and is then latched in the second strobe signal buffer 18 in response to the rising edge of the next clock signal (or time t15). Accordingly, during this interval, the contents of the first strobe signal buffer 17 are different from the contents of the second strobe signal buffer 18, whereby the output (26) from the EXNOR gate 19 assumes logic level "0". Hence, the output (27) from the two input AND gate 12 also assumes logic level "0", producing the internal strobe signal.

In the above description, it is assumed for convenience of description that upon termination of the reset, the data latch timing generation circuit 50 and the strobe latch timing generation circuit 52 immediately operate in accordance with a frequency division factor which is already set up. However, a frequency division factor may be set up at an appropriate initialization time after reset.

In this manner, a sampling of the transferred data takes place with a period which is determined by a frequency division factor established by the data latch timing generation circuit 50, and the sampling of the strobe signal takes place with a period which is determined by a frequency division factor established by the strobe latch timing generation circuit 52. A change in the contents of the transferred data D0 to D7, or an inversion of the strobe signal, produces a change in the logic level of the internal strobe signal.

As described, in the sixth embodiment, the data latch timing generation circuit 50 is provided at a stage which precedes the data change detection circuit 51, and the strobe latch timing generation circuit 52 is provided at a stage which precedes the strobe change detection circuit 53, thereby enabling a timing (or a period) to be established which is suitable to latch the transferred data or the strobe signal. In this manner, in a data transfer system in which the transferred data signal and the strobe signal have different transition times, it is possible to establish a sampling period which matches the transition time of the respective signal, thus permitting an appropriate sampling operation. Since the frequency division factor can be independently set up for the data latch timing generation circuit 50 and the strobe latch timing generation circuit 52, the present embodiment is applicable to an instance in which the transferred data and the strobe signal have different transient responses.

Seventh Embodiment

In contrast to the third embodiment in which a transition state of the transferred data is detected and the transferred data is latched upon termination of a transition state, the seventh embodiment enables a count in a counter which determines a data settling time after a change in the transferred data has been terminated, to be established by CPU.

Figure 20:
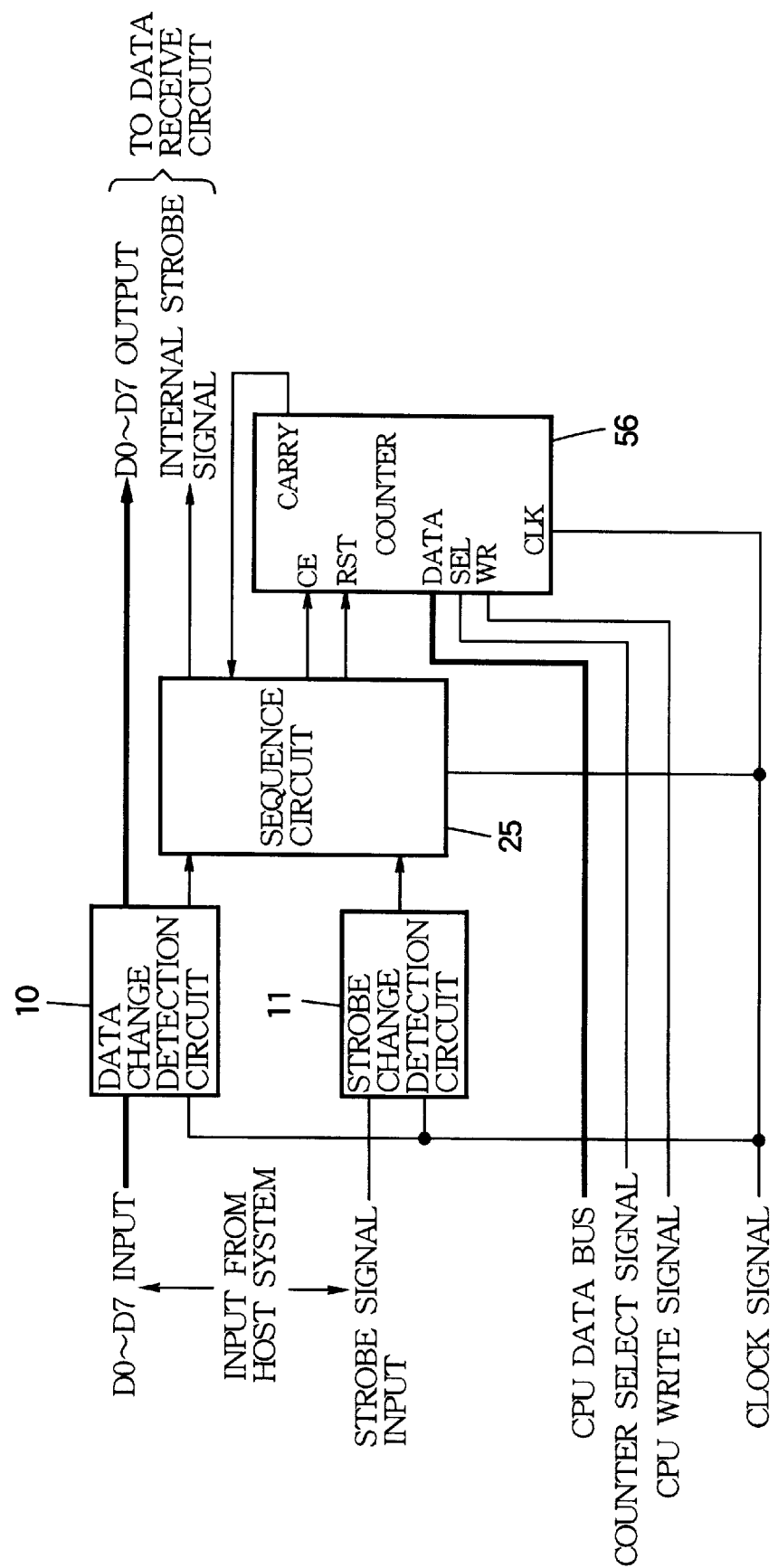
FIG. 20 is a block diagram showing the construction of a pertinent part of a peripheral unit according to a seventh embodiment of the invention.

FIG. 20 is a block diagram showing the construction of a pertinent part of a peripheral unit according to the seventh embodiment of the invention where the counter 26 shown in FIG. 7 is replaced by a counter 56 which can be preset to any count chosen. The counter 56 is connected with a CPU, not shown, through a CPU data bus (DATA), a counter select signal line (SEL) and a CPU write signal line (WR).

The sequence circuit 25 and the counter 56 operate in synchronism with a clock signal (CLK). The sequence circuit 25 receives outputs from the data change detection circuit 10 and the strobe change detection circuit 11, and a carry signal which is output by the counter 56, and outputs an internal strobe signal to a data receiver circuit, not shown, and also outputs a reset signal (RST) and a count enable signal (CE) to the counter 56.

The counter 56 is selected when a count select signal from the CPU assumes logic level "1". In this instance, a preset count which is fed from the CPU data bus is latched therein in response to the CPU write signal. The counter 56 also includes a reset terminal RST, and its count is reset to 0 when logic level "1" is applied to the reset terminal RST. A counting operation by the counter is enabled when logic level "1" is applied to a count enable terminal CE.

When the count in the counter 56 reaches the preset count which is determined by the CPU, a carry signal of logic level "1" is produced at its CARRY terminal. In other respects, the arrangement and the operation are similar to those described in connection with the third embodiment.

With the seventh embodiment, the data settling time which passes after the termination of a change in the transferred data can be chosen in an arbitrary manner, thus allowing an erroneous sampling to be prevented from occurring in a data transfer system in which the transient response of data signal varies extensively depending on the characteristics of transceiver circuits contained in a host system and a peripheral unit, and/or in the quality of a cable which provides a connection between the host system and the peripheral unit.

What is claimed is:

1. A data transfer system, comprising:

a host system; and a peripheral unit;

wherein the host system transfers data and a host strobe signal to the peripheral unit;

wherein the host system includes strobe signal inverting means for determining whether the content of data being currently transferred is the same as the content of previously transferred data, and for inverting the host strobe signal when the content of the data is being currently transferred is determined to be the same as the content of the previously transferred data;

wherein the peripheral unit includes:
  internal generation means for
    (a) generating an internal strobe signal responsive to a change in the received transferred data and
    (b) generating the internal strobe responsive to a transition of the host strobe signal;
  latching means for latching the received transferred data in response to the internal strobe signal;
  a buffer for temporarily storing the data and host strobe signal transferred by the host system; and
  means for generating a synchronization signal at a time that the data and the strobe signal are stored in said buffer;

wherein said internal generation means comprises:
  a first data buffer for receiving and storing transferred data in successive units;
  a second data buffer for receiving and storing the transferred data stored in the first data buffer after a delay;
  a data change detection circuit for detecting a data change by comparing the data stored in the first data buffer and the data stored in the second data buffer to generate a data change output,
  a first strobe signal buffer for successively receiving and storing a value of the host strobe signal;
  a second strobe signal buffer for receiving and storing the value of the host strobe signal from the first strobe signal buffer after a delay;
  a strobe change detection circuit for detecting a strobe signal change by comparing the value of the strobe signal stored in the first strobe signal buffer and the value of the host strobe signal stored in the second strobe signal buffer to generate a strobe change output; and
  a logic circuit for receiving the data change output and the strobe change output and producing an internal strobe signal;

wherein the peripheral unit further comprises:
  a first-in first-out receiving buffer for receiving transferred data;
  capacity means for determining a current capacity of the receiving buffer;
  status means for detecting a status in which the current capacity exceeds a given value; and
  not busy means for providing the detected status to the host system as a not busy signal;

wherein the host system transfers an amount of data equal to the given value in response to the not busy signal;

wherein the peripheral unit has at least three operation modes including:
  an idle mode during which the peripheral unit waits for a change in the transferred data,
  a transient mode during which the transferred data is in a process of changing, and
  a settling mode during which the peripheral unit waits for a first given time interval to pass subsequent to termination of a change in the transferred data; and wherein the peripheral unit further comprises:
  control means for:
    (1) shifting the peripheral unit to the transient mode upon detection of a change in the transferred data during the idle mode,
    (2) shifting to the settling mode at a point in time when a change in the transferred data is no longer present during the transient mode,
    (3) returning to the transient mode upon detection of a change in the transferred data during the settling mode, and
    (4) causing production of the internal strobe signal after a second given time interval has passed in the settling mode; and
  timing means for determining given time intervals.

2. A data transfer system according to claim 1, wherein the peripheral unit further includes error correction circuitry which comprises:
  storage means for storing transferred data;
  control means for:
    (a) ignoring transferred data which is currently stored in the storage means after the data change detection circuit has generated a data change output indicating a change in the transferred data if the data currently in the storage means is the same as data which was stored in the storage means at an immediately previous given time, and
    (b) causing production of the internal data strobe signal and updating contents of the storage means after the data change detection circuit generates a data change output indicating a change in the transferred data if the transferred data currently stored in the storage means is different from the data which was stored in the storage means at an immediately previous given time.

3. A data transfer system according to claim 1, wherein the logic circuit comprises:
  a sequence circuit for receiving the data change output and the strobe change output, and for producing the internal strobe signal and control signals; and
  a control counter for receiving the control signals from the sequence circuit and beginning a counting operation in response thereto, and providing a carry signal to the sequence circuit when a count of the counting operation reaches a given value;

wherein the sequence circuit includes a state counter having at least three values representing respective modes, including an idle mode, a transient mode, and a settling mode;

wherein the idle mode is an initial state of the sequence circuit;

wherein the state counter is updated to a value representing the transient mode when a transferred data change is detected during the idle mode;

wherein the state counter is updated to a value representing the settling mode, and simultaneously the control counter is reset and the counting operation enabled, when a transferred data change is not detected during the transient mode;

wherein the state counter is updated to a value representing the transient mode whenever a transferred data change is detected during the settling mode; and wherein the sequence circuit produces the internal data strobe signal and updates the state counter to a value representing the idle mode when the carry signal from the control counter is provided during the settling mode.

4. A data transfer system according to claim 3, further including preset means for allowing a preset count to be loaded into the control counter of the peripheral unit by the host system.

5. A data transfer system according to claim 1, wherein the logic circuit comprises:
   a third data buffer for storing previous transferred data in response to the internal data strobe signal;
   a third strobe signal buffer for storing a value of a previous host strobe signal;
   a first comparator for comparing the transferred data stored in the first data buffer with the previous transferred data stored in the third data buffer;
   a second comparator for comparing the value of the host strobe signal stored in the first strobe signal buffer with the value of the previous host strobe signal stored in the third strobe signal buffer;
   a state resumption detection circuit for receiving outputs from the first comparator and the second comparator, and producing a state resumption signal; and
   a sequence circuit for receiving the data change output, the strobe change output, and the state resumption signal, and for strobing the internal strobe signal and updating the third buffers based thereon;
   wherein, if the data change detection circuit generates a data change output that indicates a transferred data change, the state resumption signal controls the sequence circuit such that the sequence circuit does not strobe the internal strobe signal and does not update the third buffers; and
   wherein, if the data change detection circuit generates a data change output that indicates a transferred data change, the state resumption signal controls the sequence circuit such that the sequence circuit strobes the internal data strobe signal and simultaneously updates the third buffer.

6. A data transfer system according to claim 1, wherein the peripheral unit further comprises:
   first latch timing means for providing a first latch signal to the first data buffer indicating when transferred data is to be stored in the first data buffer; and
   second latch timing means for providing a second latch signal to the first strobe signal buffer indicating when the value of the host strobe signal is to be stored in the first strobe signal buffer;
   wherein the transferred data and the host strobe signal are respectively stored in accordance with the first and second latch signals, respectively.

7. A data transfer system comprising:
   a host system; and
   a peripheral unit;
   wherein the host system transfers data and a strobe signal to the peripheral unit;
   wherein the host system includes interface switching mode signal generating means for:
      switching operation of the host system between:
         (a) a Centronics interface mode in which the strobe signal is transferred for each transfer of data, and
         (b) a data change synchronized interface mode in which a determination is made to see if currently transferred data is the same as previously transferred data, and
      inverting the strobe signal when currently transferred data is the same as previously transferred data; and
   wherein the peripheral unit comprises:
      means for inhibiting data sampling after an initial change in the transferred data during a mode conversion from the Centronics interface mode to the data change synchronized interface mode; and
      means for inhibiting data sampling in response to a change in the strobe signal during a mode conversion from the data change synchronized interface mode to the Centronics interface mode.

8. A data transfer system, comprising:
   a host system; and
   a peripheral unit;
   wherein the host system transfers data and a host strobe signal to the peripheral unit;
   wherein the host system includes strobe signal inverting means for determining whether the content of data being currently transferred is the same as the content of previously transferred data and for inverting the host strobe signal when the content of the data is being currently transferred is determined to be the same as the content of the previously transferred data;
   wherein the peripheral unit includes:
      internal generation means for
         (a) generating an internal strobe signal responsive to a change in the received transferred data, and
         (b) generating the internal strobe responsive to a transition of the host strobe signal;
      latching means for latching the received transferred data in response to the internal strobe signal:
      a buffer for temporarily storing the data and host strobe signal transferred by the host system; and
      means for generating a synchronization signal at a time that the data and the strobe signal are stored in said buffer;
   wherein said internal generation means comprises:
      a first data buffer for receiving and storing transferred data in successive units;
      a second data buffer for receiving and storing the transferred data stored in the first data buffer after a delay;
      a data change detection circuit for detecting a data change by comparing the data stored in the first data buffer and the data stored in the second data buffer to generate a data change output;
      a first strobe signal buffer for successively receiving and storing a value of the host strobe signal;
      a second strobe signal buffer for receiving and storing the value of the host strobe signal from the first strobe signal buffer after a delay;
      a strobe change detection circuit for detecting a strobe signal change by comparing the value of the strobe signal stored in the first strobe signal buffer and the value of the host strobe signal stored in the second strobe signal buffer to generate a strobe change output; and
      a logic circuit for receiving the data change output and the strobe change output and producing an internal strobe signal;
   wherein the peripheral unit further comprises:
      a receiving buffer for receiving transferred data;
      capacity means for determining a current capacity of the receiving buffer;
      comparing means for comparing the determined current capacity of the receiving buffer with a predetermined value to produce a comparison signal; and
      busy means for providing a busy status to the host based on the comparison signal;
   wherein the host system successively transfers an amount of data equal to the predetermined value based on the busy status; and
   wherein the internal generation means generates the internal strobe signal responsive to the transition of the host strobe signal in a first direction, and also responsive to the transition of the host strobe signal in a second direction.

9. A data transfer system comprising:
a host which provides a timing signal and data at an output thereof; and
a peripheral device which includes
a buffer for temporarily storing the data and host strobe signal transferred by the host system; and
means for generating a synchronization signal at a time that the data and the strobe signal are stored in said buffer; and
wherein the peripheral device
receives the timing signal and data from the host output,
produces an internal timing signal on detection of a change in the data,
produces the internal timing signal on detection of a change in a polarity of the timing signal provided by the host, and
latches the data from the host output responsive to the produced internal timing signal.

10. The data transfer system of claim 9, wherein the host inverts the polarity of the timing signal when there is no difference between data currently present at the host output and data present at the host output at a given previous time.

11. The data transfer system of claim 9, wherein the data is discrete data having a plurality of bits.

12. The data transfer system of claim 9, wherein the timing signal provided by the host is a host strobe signal, wherein the internal timing signal produced by the peripheral device is an internal strobe signal, and wherein the detected change in the polarity of the host timing signal is a reversal of polarity of the host strobe signal.

13. The data transfer system of claim 9, wherein the host comprises:
a processor which executes instructions to control the data transfer system;
memory which stores the data to be provided to the peripheral device; and
an input/output port which receives the data to be provided from the memory under control of the processor, and provides the data and the timing signal to the peripheral device under control of the processor.

14. The data transfer system of claim 9, wherein the peripheral device comprises:
a data change detection device which receives and stores successive data outputs from the host, detects a change in the successive data outputs from the host, and provides a data change signal indicative of a change state in the data received from the host;
a timing signal change detection device which receives successive timing signals from the host, detects a change in the successive timing signals from the host, and generates a timing signal change signal indicative of a change state in the timing signals received from the host; and
an internal timing signal generator which receives the data change signal and the timing signal change signal, and produces therefrom the internal timing signal.

15. The data transfer system of claim 14, wherein the data change detection device comprises:
a first buffer which successively receives and stores the data provided by the host;
a second buffer which successively receives and stores the data from the first buffer; and
data change logic circuitry which compares the data stored in the first buffer and the data stored in the second buffer, and which provides the data change signal based on a comparison result.

16. The data transfer system of claim 14, wherein the timing signal change detection device comprises:
a first latch which successively receives and stores values of the timing signal provided by the host;
a second latch which successively receives and stores the timing signal values stored in the first latch; and
timing signal change logic circuitry which compares the timing signal value stored in the first latch and the timing signal value stored in the second latch, and generates the timing signal change signal based on a comparison result.

17. The data transfer system of claim 14, wherein the internal timing signal generator comprises an internal timing signal logic device which temporarily changes a polarity of the internal timing signal when the data change signal indicates a change in the data received from the hosts, or when the timing signal change signal indicates a change in the timing signal received from the host.

18. The data transfer system of claim 14, wherein the internal timing signal generator comprises:
a sequence circuit which receives the data change signal and the timing signal change signal, and produces the internal timing signal; and
a counter which receives control signals from the sequence circuit, and provides a carry signal to the sequence circuit.

19. The data transfer system of claim 18, further comprising noise cancellation circuitry which detects a momentary change in data provided by the host that is indicative of noise, and provides a state resumption signal to the sequence circuit, wherein in response to the state resumption signal, the sequence circuit produces the internal timing signal based on a data change signal indicating no data change, regardless of an actual value of the data change signal.

20. The data transfer system of claim 19, wherein the state resumption signal is a logical combination of the timing signal provided by the host and the data change signal, such that when a change in the timing signal provided by the host and a change in the data provided by the host are detected at the same time, the noise cancellation circuitry detects this condition as being indicative of noise.

21. The data transfer system of claim 14, further comprising a mode change circuit which receives a mode change signal from the host and changes an operating mode of the peripheral device based thereon;
wherein the mode change circuit, the timing signal change detection device, and the internal timing signal generator form a sequence circuit.

22. The data transfer system of claim 9, wherein the peripheral device comprises:
a data change detection device which receives and stores data outputs received from the host, detects a change in successive ones of the data outputs received from the host, and provides a data change signal indicative of a change in the successive ones of the data outputs received from the host; and
a timing signal change detection device which receives the timing signals from the host, detects a change in successive values of the timing signals received from the host, and generates a timing signal change signal indicative of a change state in the timing signal received from the host.

23. The data transfer system of claim 22, further comprising:
   a received processor of the peripheral device;
   a FIFO receiving buffer which receives and stores data from the data change detection device, receives a logical combination of the data change signal and the timing signal change signal, receives a read signal from the received processor of the peripheral device, and provides data stored therein to the received processor in response to the read signal;
   a counter which receives the logical combination of the data change signal and the timing signal change signal, the read signal from the received processor of the peripheral device, and an initial count value and control signals from the host, and which generates a current count value; and
   a count comparison device which compares the current count value from the counter with a receiving buffer capacity value, and which generates a busy signal to the host based thereon;
   wherein the counter counts down based on the logical combination of the data change signal and the timing signal change signal, and counts up based on the read signal from the received processor of the peripheral device, so that data is transferred from the host to the peripheral in blocks.

24. The data transfer system of claim 9, wherein the peripheral device produces the internal timing signal based on detection of the change in the polarity of the timing signal in a first direction, and also based on detection of the change in the polarity of the timing signal in a second direction that is opposite to the first direction.

* * * * *